US012620290B2

(12) United States Patent
Ludwick et al.

(10) Patent No.: US 12,620,290 B2
(45) Date of Patent: May 5, 2026

(54) GUI WITH A BONUS SYMBOL WINDOW TO USE CREDIT VALUE FOR INITIATING A JACKPOT CHANCE GAME AND A FEATURE GAME WITH HOLD-AND-SPIN FUNCTIONALITY

(71) Applicant: Aristocrat Technologies, Inc., Las Vegas, NV (US)

(72) Inventors: John Ludwick, Reno, NV (US); Christmas Uberuaga, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 263 days.

(21) Appl. No.: 18/455,526

(22) Filed: Aug. 24, 2023

(65) Prior Publication Data

US 2025/0069477 A1 Feb. 27, 2025

(51) Int. Cl.
*G07F 17/32* (2006.01)

(52) U.S. Cl.
CPC ...... *G07F 17/3258* (2013.01); *G07F 17/3262* (2013.01)

(58) Field of Classification Search
None
See application file for complete search history.

(56) References Cited

U.S. PATENT DOCUMENTS

| | | | |
|---|---|---|---|
| 6,186,894 B1 | 2/2001 | Mayeroff | |
| 10,373,441 B1 | 8/2019 | Halvorson | |
| 11,055,951 B2 * | 7/2021 | La Guardia | G07F 17/3267 |
| 11,640,748 B2 * | 5/2023 | Marks | G07F 17/34 463/20 |
| 2005/0101368 A1 | 5/2005 | Thomas | |
| 2005/0250567 A1 * | 11/2005 | Kane | G07F 17/32 463/16 |
| 2009/0124353 A1 | 5/2009 | Collette | |
| 2009/0197664 A1 | 8/2009 | Schultz | |
| 2009/0233702 A1 | 9/2009 | Bramble | |
| 2009/0233703 A1 | 9/2009 | Barnes | |
| 2009/0239641 A1 | 9/2009 | Abe | |
| 2010/0124981 A1 | 5/2010 | Kato | |
| 2010/0137061 A1 | 6/2010 | Ellis | |
| 2011/0183743 A1 | 7/2011 | Stevens | |
| 2012/0015707 A1 | 1/2012 | Hornik | |

(Continued)

FOREIGN PATENT DOCUMENTS

AU 2011101248 B4 7/2012

OTHER PUBLICATIONS

DL Slot Vids, "Acorn Pixie Slot Machine—Buy a Bonus Feature Buyer Beware!!", https://www.youtube.com/watch?v=VHfjbWITdOY, 2015.

(Continued)

*Primary Examiner* — Tramar Harper
(74) *Attorney, Agent, or Firm* — Weaver Austin Villeneuve & Sampson LLP

(57) ABSTRACT

A graphical user interface for providing, on-demand, a game of chance with a hold-and-spin feature game mechanic in a format that features a larger number of reels and chances to receive prizes than are provided in typical hold-and-spin games. The graphical interface is configured to nevertheless provide a hold-and-spin gameplay experience similar to that found in hold-and-spin games having a smaller number of reels.

20 Claims, 18 Drawing Sheets

(56) References Cited

U.S. PATENT DOCUMENTS

| | | | | |
|---|---|---|---|---|
| 2012/0122544 | A1 | 5/2012 | Roemer | |
| 2012/0178519 | A1 | 7/2012 | Walker | |
| 2012/0289301 | A1 | 11/2012 | Cuddy | |
| 2013/0217465 | A1 | 8/2013 | Jaffe | |
| 2013/0281170 | A1 | 10/2013 | Weiss | |
| 2013/0288782 | A1 | 10/2013 | Hornik | |
| 2014/0057697 | A1 | 2/2014 | Nelson | |
| 2014/0094282 | A1 | 4/2014 | Bryant | |
| 2015/0317877 | A1 | 11/2015 | Rodgers | |
| 2015/0371489 | A1 | 12/2015 | Aoki | |
| 2016/0225233 | A1 | 8/2016 | Arezina | |
| 2016/0321857 | A1 | 11/2016 | Meyer | |
| 2017/0365127 | A1 | 12/2017 | Zoble | |
| 2018/0197379 | A1 | 7/2018 | Crispino | |
| 2018/0218564 | A1 | 8/2018 | Elmqvist | |
| 2019/0073876 | A1 | 3/2019 | Satterlie | |
| 2020/0005587 | A1 | 1/2020 | Hartl | |
| 2020/0193773 | A1* | 6/2020 | Olive | G07F 17/32 |
| 2020/0402351 | A1 | 12/2020 | Wotton | |
| 2021/0256811 | A1* | 8/2021 | Uberuaga | G07F 17/3213 |
| 2021/0264724 | A1* | 8/2021 | Decasa, Jr. | G07F 17/3213 |
| 2022/0036691 | A1* | 2/2022 | Meyer | G07F 17/3244 |
| 2022/0036701 | A1* | 2/2022 | Loader | G07F 17/3213 |
| 2022/0084365 | A1 | 3/2022 | Penacho | |
| 2022/0092918 | A1 | 3/2022 | Uberuaga | |
| 2023/0343168 | A1 | 10/2023 | Richard | |
| 2024/0087421 | A1* | 3/2024 | Walsh | G07F 17/3267 |
| 2024/0104995 | A1* | 3/2024 | Loader | G07F 17/3213 |
| 2024/0112546 | A1* | 4/2024 | Gansert | G07F 17/3213 |
| 2024/0420547 | A1* | 12/2024 | Jones | G07F 17/34 |
| 2025/0069467 | A1* | 2/2025 | Ludwick | G07F 17/3213 |
| 2025/0087057 | A1* | 3/2025 | DeBrabander | G07F 17/3262 |
| 2025/0095442 | A1* | 3/2025 | Winata | G07F 17/3258 |

OTHER PUBLICATIONS

All Casino Action, "Bough a Bonus For Christmas! Christmas Vacation Slot Machine!", Slot Lady Gaming, https://www.youtube.com/watch?v=JbJHb53NZIs, 2020.

Office Action (Non-Final Rejection) dated Aug. 11, 2023 for U.S. Appl. No. 17/710,267 (pp. 1-10).

Big Jackpot Winter, "Buying The $500 Instant Feature On Coin Trio!!! Buying bonuses!", https://www.youtube.com/watch?v=vqcst6gEVOk.

Office Action (Final Rejection) dated Dec. 29, 2023 for U.S. Appl. No. 17/710,267 (pp. 1-13).

Office Action (Notice of Allowance and Fees Due (PTOL-85)) dated Apr. 30, 2024 for U.S. Appl. No. 17/710,267 (pp. 1-9).

* cited by examiner

GUI WITH A BONUS SYMBOL WINDOW TO USE CREDIT VALUE FOR INITIATING A JACKPOT CHANCE GAME AND A FEATURE GAME WITH HOLD-AND-SPIN FUNCTIONALITY

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In some games of chance, e.g., slot-type games, there may be certain symbols that, when displayed (or when at least a certain number of them are displayed) as part of a game outcome cause awards specific to each such symbol to be awarded to the player. Such symbols are typically referred to as "cash-on-reel" symbols.

SUMMARY

Some games of chance may include a base game in which players try and obtain winning combinations of symbols, e.g., a winning combination of symbols along a payline. In some such games of chance, there may be a specified number of paylines, and only combinations of symbols that occur along one or more such paylines may be considered to potentially be winning patterns. In other games of chance, any combination of a displayed symbol from each of the reels may be considered to potentially be a winning pattern. For example, for a 5-reel slot machine game in which each reel has three symbol windows in which to display symbols, there may be 3 to the 5th power, i.e., 243, potential combinations of symbols drawn from the three symbols displayed by each reel. In other words, for a slot game with 5 reels, each showing symbols in three symbol windows in a game outcome, there are 243 paylines covering all possible 5-symbol combinations involving one symbol from each reel. The winning symbol combinations that may be obtained along such paylines may result in an award of credits or other items to a player that obtains such winning symbol combinations.

In some such games of chance, there may be additional games (e.g., a jackpot chance game, a feature game) that may be triggerable from the base game responsive to one or more predetermined events, conditions, etc. One method of triggering these additional games in connection with the EGM may be responsive to input (e.g., player request with payment). Another method of triggering these additional games for the same EGM may be responsive to a random outcome in base game. The random outcome may originate from an output of a random number generator (RNG) in association with game play of the base game. The random outcome may be in response to a symbol (e.g., a metamorphic triggering symbol) being displayed that feeds a metamorphic (e.g., a metamorphic indicator), and any time such a symbol is displayed, there is a random check to see if the feature game is initiated as well.

There may be a multitude of different feature games that may be used for this purpose, but one popular feature game is a hold-and-spin feature game. In a typical hold-and-spin feature game, each play of the feature game results in one or more symbols being newly selected for display in symbol windows that do not already have a symbol of a particular type displayed therein. For example, if the particular type of symbol is a cash-on-reel (COR) symbol, each COR symbol that is shown in one of the symbol windows during the feature game may be "held" in place during the next play of the feature game. Thus, only the symbols shown in the symbol windows without COR symbols would see a change in the symbols displayed during a play of the feature game.

When such a feature game is initiated for a player, the player receives a set number, e.g., six, spins or plays of the feature game. The number of plays of the feature game is decremented by one for each play of the feature game engaged in by the player. In some implementations, if a play of the feature game results in presentation of a symbol of the particular type of symbol, e.g., a COR symbol, that is to be "held" in place (and which was not displayed by virtue of having been "held" in place from a previous play of the feature game), the number of plays of the feature game may be reset or adjusted to a higher number. For example, in some implementations, each time there is a feature game play in which one or more COR symbols are displayed in symbol windows that did not have such COR symbols displayed after the game play that occurred immediately prior to the current game play, the number of game plays remaining that the player may have may be reset to the starting number of feature game plays or, in some cases, incremented by some amount, e.g., two feature game plays.

Such feature games may end either when the number of game plays remaining reaches zero (and no additional symbol of the particular type of symbol is shown as a result of the last feature game play) or when all of the symbol windows have symbols of the particular type of symbol shown. When the feature game ends, the player may, in some cases, be awarded with one or more prizes. In some instances, such prizes may include credit or point awards that are commensurate with values associated with the displayed symbols that are of the particular symbol type. For example, symbols that are COR symbols may each have a numeric value associated therewith; such values may be pre-assigned to the COR symbols or may be randomly assigned to a COR symbol at the time that the COR symbol is displayed.

As previously discussed, the feature game may be triggered by one or more events or conditions. In one example, the feature game may be triggered responsive to a random outcome in the base game. The random outcome may be responsive to a symbol (e.g., a metamorphic triggering symbol) being displayed that feeds a metamorphic (e.g., a metamorphic indicator), and any time such a symbol is displayed, there may be a random check to see if the feature game is initiated. In another example, the feature game may be triggered responsive to input (e.g., a player requesting on-demand game play of the feature game by purchasing the feature game). The EGM may include one or more processors that cause, responsive to receipt of input, the one or more graphical user interfaces (GUIs) to present an instant feature animation that concludes with an instant feature indicator being displayed in either a jackpot chance state or a feature game state. The one or more processors may initiate, based on the instant feature animation concluding with the instant feature indicator in the jackpot chance state, an instance of a jackpot chance game. For each instance of the jackpot chance game, the one or more GUIs may be caused to sequentially present one or more jackpot values. Each presented jackpot value in the instance of the jackpot chance game may be larger than any jackpot value previously presented in the instance of the jackpot chance game, and the jackpot value presented at the conclusion of the instance of the jackpot chance game may be caused to be added to a credit meter displayed by the one or more GUIs. The one or more processors may further cause one or more of a plurality of metamorphic indicators displayed by the one or more GUIs to be displayed in a triggered state. The plurality of metamorphic indicators may include a bonus metamorphic indicator and a plurality of regular metamorphic indicators. Each metamorphic indicator may be associated with a different corresponding feature game enhancement. The one or more processors may cause, in association with causing the one or more metamorphic indicators to be displayed in the triggered state, a first instance of the feature game to be presented by the one or more GUIs. The first instance of the feature game may include the corresponding feature game enhancement for each regular metamorphic indicator that was caused to be displayed in the triggered state in association with presentation of the first instance of the feature game.

A system is provided that may include one or more displays configured to present one or more graphical user interfaces (GUIs). The system may further include one or more processors and one or more memory devices. The memory device(s) may store computer-executable instructions which, when executed by the processor(s), cause the processor(s) to receive an input indicating a request to play a feature game and a chance to play a jackpot chance game. The memory device(s) may store additional computer-executable instructions which, when executed by the processor(s), cause, responsive to receipt of the input, the GUI(s) to present an instant feature animation that concludes with an instant feature indicator being displayed in either a jackpot chance state or a feature game state. The memory device(s) may store additional computer-executable instructions which, when executed by the processor(s), cause, based on the instant feature animation concluding with the instant feature indicator in the jackpot chance state, an instance of the jackpot chance game. For each instance of the jackpot chance game, the GUI(s) may be caused to sequentially present one or more jackpot values. Each presented jackpot value in the instance of the jackpot chance game may be larger than any jackpot value previously presented in the instance of the jackpot chance game, and the jackpot value presented at the conclusion of the instance of the jackpot chance game may be caused to be added to a credit meter displayed by the GUI(s). The memory device(s) may store additional computer-executable instructions which, when executed by the processor(s), cause, also responsive to receipt of the input, one or more of a plurality of metamorphic indicators displayed by the GUI(s) to be displayed in a triggered state. The metamorphic indicator(s) may include a bonus metamorphic indicator and a plurality of regular metamorphic indicators. Each metamorphic indicator may be associated with a different corresponding feature game enhancement. The memory device(s) may store additional computer-executable instructions which, when executed by the processor(s), cause, in association with causing the metamorphic indicator(s) to be displayed in the triggered state, a first instance of the feature game to be presented by the GUI(s). The first instance of the feature game may include the corresponding feature game enhancement for each regular metamorphic indicator that was caused to be displayed in the triggered state in association with presentation of the first instance of the feature game.

The memory device(s) may store additional computer-executable instructions which, when executed by the processor(s), cause the processor(s) to cause, in association with causing the bonus metamorphic indicator to be displayed in the triggered state, a second instance of the feature game to be presented by the GUI(s). The second instance of the feature game may include the corresponding feature game enhancement for each regular metamorphic indicator that was caused to be displayed in the triggered state in association with presentation of the first instance of the feature game.

The memory device(s) may store additional computer-executable instructions which, when executed by the processor(s), cause the processor(s) to cause the GUI(s) to simultaneously present the first instance of the feature game and the second instance of the feature game.

The memory device(s) may store additional computer-executable instructions which, when executed by the processor(s), cause the processor(s) to cause the GUI(s) to serially present the first instance of the feature game and the second instance of the feature game.

The memory device(s) may store additional computer-executable instructions which, when executed by the processor(s), cause the processor(s) to cause the bonus metamorphic indicator, when displayed in the triggered state, to be displayed in the triggered state in tandem with the regular metamorphic indicator(s) being displayed in the triggered state.

The memory device(s) may store additional computer-executable instructions which, when executed by the processor(s), cause the processor(s) to associate each metamorphic indicator with a corresponding ordered sequence of graphical states.

The memory device(s) may store additional computer-executable instructions which, when executed by the processor(s), cause the processor(s) to cause the GUI(s) to present, during a base game, a plurality of symbol windows including a bonus symbol window. The memory device(s) may store additional computer-executable instructions which, when executed by the processor(s), cause the processor(s) to cause, responsive to each play of the base game, a corresponding symbol to be selected and displayed in each symbol window. The memory device(s) may store additional computer-executable instructions which, when executed by the processor(s), cause the processor(s) to cause, responsive to the symbol that is selected and displayed in the bonus symbol window being a bonus metamorphic trigger symbol, a random determination to be made as to whether to initiate the first instance of the feature game including one or more feature game enhancements associated with the regular metamorphic indicator(s). The memory device(s) may store additional computer-executable instructions which, when executed by the processor(s), cause the processor(s) to cause, responsive to the symbol that is selected and displayed in the bonus symbol window being a jackpot trigger symbol, the instance of the jackpot chance game.

One or more non-transitory computer-readable media (CRM) is provided that may store computer-executable instructions which, when executed by one or more processors, cause the processor(s) to receive an input indicating a request to play a feature game and a chance to play a jackpot chance game. The CRM may store additional computer-executable instructions which, when executed by the processor(s), cause the processor(s) to cause, responsive to receipt of the input, the GUI(s) to present an instant feature animation that concludes with an instant feature indicator being displayed in either a jackpot chance state or a feature game state. The CRM may store additional computer-executable instructions which, when executed by the processor(s), cause the processor(s) to initiate, based on the instant feature animation concluding with the instant feature indicator in the jackpot chance state, an instance of a jackpot chance game. For each instance of the jackpot chance game, the GUI(s) may be caused to sequentially present one or more jackpot values. Each presented jackpot value in the instance of the jackpot chance game may be larger than any jackpot value previously presented in the instance of the jackpot chance game, and the jackpot value presented at the conclusion of the instance of the jackpot chance game may be caused to be added to a credit meter displayed by the GUI(s). The CRM may store additional computer-executable instructions which, when executed by the processor(s), cause the processor(s) to cause one or more of a plurality of metamorphic indicators displayed by the GUI(s) to be displayed in a triggered state. The metamorphic indicators may include a bonus metamorphic indicator and a plurality of regular metamorphic indicators. Each metamorphic indicator may be associated with a different corresponding feature game enhancement. The CRM may store additional computer-executable instructions which, when executed by the processor(s), cause the processor(s) to cause, in association with causing the metamorphic indicator(s) to be displayed in the triggered state, a first instance of the feature game to be presented by the GUI(s). The first instance of the feature game may include the corresponding feature game enhancement for each regular metamorphic indicator that was caused to be displayed in the triggered state in association with presentation of the first instance of the feature game.

The CRM may store additional computer-executable instructions which, when executed by the processor(s), cause the processor(s) to cause, in association with causing the bonus metamorphic indicator to be displayed in the triggered state, a second instance of the feature game to be presented by the GUI(s). The second instance of the feature game may include the corresponding feature game enhancement for each regular metamorphic indicator that was caused to be displayed in the triggered state in association with presentation of the first instance of the feature game.

The CRM may store additional computer-executable instructions which, when executed by the processor(s), cause the processor(s) to cause the GUI(s) to simultaneously present the first instance of the feature game and the second instance of the feature game.

The CRM may store additional computer-executable instructions which, when executed by the processor(s), cause the processor(s) to cause the GUI(s) to serially present the first instance of the feature game and the second instance of the feature game.

The CRM may store additional computer-executable instructions which, when executed by the processor(s), cause the processor(s) to cause the bonus metamorphic indicator, when displayed in the triggered state, to be displayed in the triggered state in tandem with the regular metamorphic indicator(s) being displayed in the triggered state.

The CRM may store additional computer-executable instructions which, when executed by the processor(s), cause the processor(s) to associate each metamorphic indicator with a corresponding ordered sequence of graphical states.

The CRM may store additional computer-executable instructions which, when executed by the processor(s), cause the processor(s) to cause the GUI(s) to present, during a base game, a plurality of symbol windows including a bonus symbol window. The CRM may store additional computer-executable instructions which, when executed by the processor(s), cause the processor(s) to cause, responsive to each play of the base game, a corresponding symbol to be selected and displayed in each symbol window. The CRM may store additional computer-executable instructions which, when executed by the processor(s), cause the processor(s) to cause, responsive to the symbol that is selected and displayed in the bonus symbol window being a bonus metamorphic trigger symbol, a random determination to be made as to whether to initiate the first instance of the feature game including the feature game enhancement(s) associated with the regular metamorphic indicator(s). The CRM may store additional computer-executable instructions which, when executed by the processor(s), cause the processor(s) to cause, responsive to the symbol that is selected and displayed in the bonus symbol window being a jackpot trigger symbol, the instance of the jackpot chance game.

A method is provided that may operate a system having one or more displays and one or more non-transitory computer readable storage media (CRM). The CRM may have one or more processors and one or more memory devices, with the memory device(s) storing computer-executable instructions. The method may include receiving an input indicating a request to play a feature game and a chance to play a jackpot chance game. The method may further include causing, responsive to receipt of the input, one or more graphical user interfaces (GUIs) to present an instant feature animation that concludes with an instant feature indicator being displayed in either a jackpot chance state or a feature game state. The method may further include causing, based on the instant feature animation concluding with the instant feature indicator in the jackpot chance state, an instance of a jackpot chance game. For each instance of the jackpot chance game, the GUI(s) are caused to sequentially present one or more jackpot values. Each presented jackpot value in the instance of the jackpot chance game may be larger than any jackpot value previously presented in the instance of the jackpot chance game, and the jackpot value presented at the conclusion of the instance of the jackpot chance game may be caused to be added to a credit meter displayed by the GUI(s). The method may further include causing one or more of a plurality of metamorphic indicators displayed by the GUI(s) to be displayed in a triggered state. The plurality of metamorphic indicators may include a bonus metamorphic indicator and a plurality of regular metamorphic indicators. Each metamorphic indicator may be associated with a different corresponding feature game enhancement. The method may further include causing, in association with causing the metamorphic indicator(s) to be displayed in the triggered state, a first instance of the feature game to be presented by the GUI(s). The first instance of the feature game may include the corresponding feature game enhancement for each regular metamorphic indicator that was caused to be displayed in the triggered state in association with presentation of the first instance of the feature game.

The method may further include causing, in association with causing the bonus metamorphic indicator to be displayed in the triggered state, a second instance of the feature game to be presented by the GUI(s). The second instance of the feature game may include the corresponding feature game enhancement for each regular metamorphic indicator that was caused to be displayed in the triggered state in association with presentation of the first instance of the feature game.

The method may further include causing the GUI(s) to simultaneously present the first instance of the feature game and the second instance of the feature game.

The method may further include causing the bonus metamorphic indicator, when displayed in the triggered state, to be displayed in the triggered state in tandem with the regular metamorphic indicator(s) being displayed in the triggered state.

The method may further include associating each of the metamorphic indicators with a corresponding ordered sequence of graphical states.

The method may further include causing the GUI(s) to present, during a base game, a plurality of symbol windows including a bonus symbol window. The method may further include causing, responsive to each play of the base game, a corresponding symbol to be selected and displayed in each symbol window. The method may further include causing, responsive to the symbol that is selected and displayed in the bonus symbol window being a bonus metamorphic trigger symbol, a random determination to be made as to whether to initiate the first instance of the feature game including one or more of the feature game enhancements associated with the regular metamorphic indicators. The method may further include causing, responsive to the symbol that is selected and displayed in the bonus symbol window being a jackpot trigger symbol, the instance of the jackpot chance game.

Figure 1:
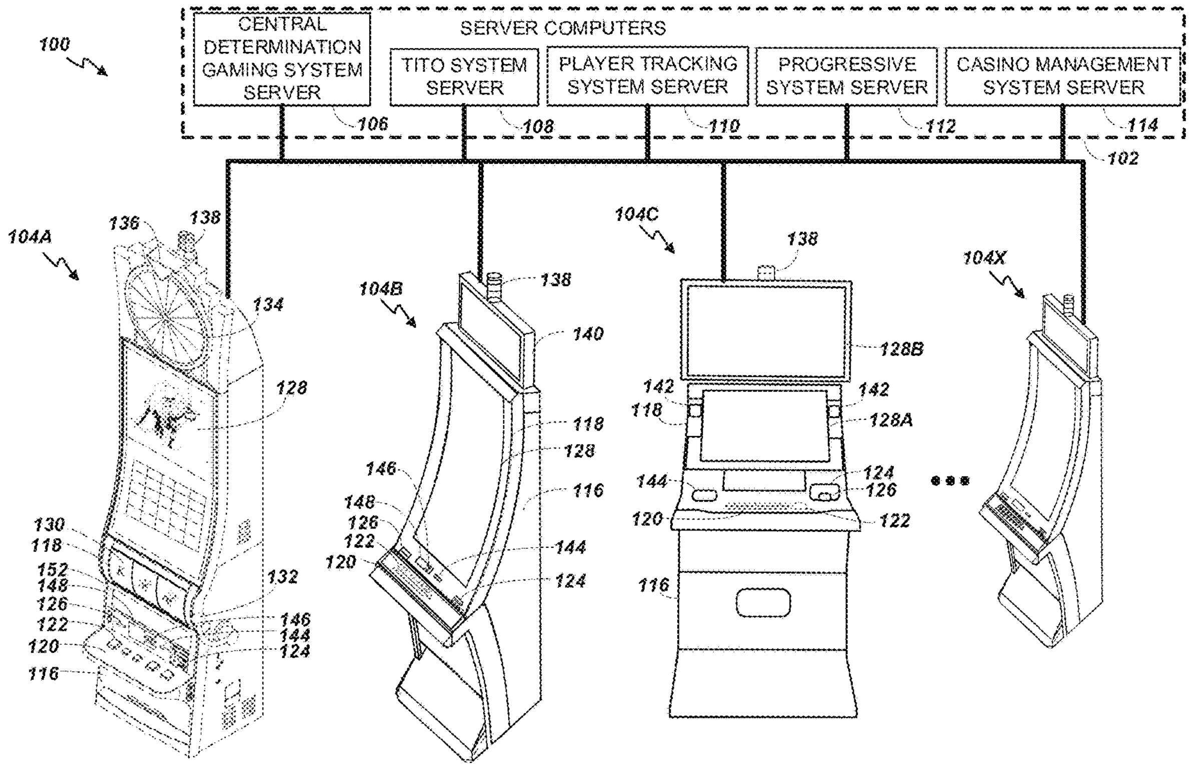
FIG. 1 is an exemplary diagram showing several EGMs networked with various gaming-related servers.

The Figures are provided for the purpose of providing examples and clarity regarding various aspects of this disclosure and are not intended to be limiting.

DETAILED DESCRIPTION

Examples of the present disclosure provide systems and methods of improving display device functionality (e.g., on an EGM), by providing visual indicators to help players understand the game mechanics described herein. An EGM may provide an electronic game that includes a base game, a feature game, and a jackpot chance game. Each one of these games may have game mechanics including the rules, elements, and processes that govern game play during a corresponding one of those games and how game play during one game may trigger one or more of the other games (e.g., game play during the base game that triggers the feature game). However, as these game mechanics increase in complexity, a technical problem is encountered as the player may at times experience difficulty following the game play.

During play of the base game, an example system may cause one or more graphical user interfaces (GUIs) to present multiple symbol windows and multiple metamorphic indicators. The symbol windows may include a bonus symbol window, and the metamorphic indicators may include one or more regular metamorphic indicators and a bonus metamorphic indicator. Each regular metamorphic indicator may be associated with a corresponding feature game enhancement. Furthermore, each regular metamorphic indicator may be associated with a corresponding regular metamorphic trigger symbol, and the bonus metamorphic indicator may be associated with a corresponding bonus metamorphic trigger symbol. Responsive to each play of the base game, the system may cause a corresponding symbol to be selected and displayed in each symbol window. Responsive to the GUI displaying one or more regular metamorphic trigger symbols in a base game outcome, the system may determine whether to initiate a first instance of a feature game that includes one or more feature game enhancements corresponding to one of the regular metamorphic indicators. Responsive to the GUI displaying the bonus metamorphic trigger symbol in the bonus symbol window, the system may further determine whether to initiate the first instance of the feature game as well as a second instance of the feature game that also includes one or more feature game enhancements corresponding to one of the regular metamorphic indicators. Responsive to the system determining that the first instance of the feature game is to be initiated, the GUI may present the first instance of the feature game. Responsive to the system determining that the first instance of the feature game and the second instance of the feature game are to be initiated, the GUI may present the first instance of the feature game and the second instance of the feature game. Responsive to the symbol that is selected and displayed in the bonus symbol window being a jackpot trigger symbol, the system may initiate an instance of a jackpot chance game. Thus, at the end of the base game, the symbols including any trigger symbols (e.g., one or more of the regular metamorphic trigger symbols, the bonus metamorphic trigger symbol, etc.) and/or any indicators (e.g., one or more of the regular metamorphic indicators, the bonus metamorphic indicator, etc.) may be evaluated to determine if a feature game has been awarded to the player and what feature game enhancements will be used in the feature game. Also, at the end of the base game, the symbols including the jackpot chance symbol may be evaluated against a pay table to determine if and what jackpot value may be awarded to the player. The system may improve player experience at a gaming machine/system because the player may be encouraged to stay for the full number of spins until the end of the base game so that the feature game and/or the jackpot game will be initiated. If the jackpot chance game is awarded, a prize up to a maximum jackpot value is guaranteed, further increasing player excitement as the one or more GUIs sequentially present larger jackpot values in the jackpot game.

During play of the base game, another example system may receive an input (e.g., a purchase by a user) indicating a request to play an on-demand feature game and a chance to play a jackpot chance game. Responsive to the input, one or more graphical user interfaces (GUIs) may be caused to present an instant feature animation that concludes with an instant feature indicator being displayed in either a jackpot chance state or a feature game state. Responsive to the instant feature animation concluding in the jackpot chance state, an instance of the jackpot chance game may be initiated. For each instance of the jackpot chance game, the GUI may be caused to sequentially present jackpot values. Each present jackpot value may be larger than any jackpot value previously presented in the instance of the jackpot chance game, and the jackpot value presented at the conclusion of the instance of the jackpot chance game may be caused to be added to a credit meter displayed by the GUI. Further responsive to the input, the GUI may be caused to display one or more metamorphic indicators in a triggered state. The metamorphic indicators may include a bonus metamorphic indicator and multiple regular metamorphic indicators, wherein each metamorphic indicator is associated with a different corresponding feature game enhancement. Responsive to one or more metamorphic indicators being displayed in the triggered state, the GUI may be caused to present a first instance of the feature game, wherein the first instance of the feature game includes the corresponding feature game enhancement for each regular metamorphic indicator displayed in the triggered state. Thus, responsive to input indicating the player's request for the feature game and the chance for the jackpot chance game, the instant feature animation may be used to communicate the chance to play the jackpot chance game. At the end of the instant feature animation, the instant feature indicator may indicate if the instance of the jackpot chance game has been awarded to the user, and the GUIs may present what jackpot value may be awarded at the conclusion of the jackpot chance game. The system may improve player experience at a gaming machine/system because the player may be able to request (e.g., via payment) and receive on-demand an instance of the feature game, along with a chance for an instance of the jackpot chance game. If the instance of the jackpot chance game is awarded, a prize up to a maximum jackpot value is guaranteed, further increasing player excitement as the one or more GUIs sequentially present larger jackpot values in the jackpot game.

These and other example systems (e.g., the EGM) may be practiced in combination or in isolation to summarize and present game mechanics in a manner that improves the efficiency of these systems. Each example system provides an improved user interface displaying a limited set of information to players, potentially within a small screen, such that players can more quickly understand the current status of the game and navigate to the next play of the game (e.g., the base game, the feature game, the jackpot chance game, etc.). The systems and methods provided herein may improve display device functionality (e.g., on the EGM), by providing multiple visual indicators that communicate game mechanics described herein to players. The systems and methods provided herein may also improve display and machine efficiency by eliminating the need for complex information pages describing game mechanics to players. Because of at least the easily understood animations, symbols, symbol windows, and indicators displayed in the game, the game described herein can be played and understood on a single screen substantially smaller than some of the EGMs described herein (e.g., a mobile device such as a cell phone), thus removing the need for multiple displays with complex information screens including lengthy text.

The technical effects and advantages achieved by the systems and methods of the present disclosure (in combination or isolation) include at least one of: (a) displaying large quantities of complex information in a relatively small display area; (b) communicating complex information with easy-to-understand animations on a display; (c) engaging a player to purchase a feature game and a chance for a jackpot chance game; (d) increasing player excitement by guaranteeing an award during play of the jackpot chance game; (e) displaying the number of spins played during the base game in an increasing transitional sequence; (f) clearly indicating when a player has entered the jackpot chance game or the feature game; (g) associating feature game enhancements with regular metamorphic indicators to clearly indicate which feature game enhancements are unlocked at any given time; (h) clearly indicating when a jackpot and/or feature game with one or more feature game enhancements have been triggered during play of the base game, the feature game, and/or the jackpot chance game; (i) efficiently communicating different game rules of a the base game, the jackpot chance game, and the feature game to a player on the display during game play; and (j) providing versatility as to which devices (e.g., EGMs, mobile devices, etc.) the games described herein may be played on because of the efficient display area designs described herein.

The following discussion provides overall context for gaming machines that may be used to implement a feature game mechanic such as is described above and later herein. Following this overview, a more focused discussion of the feature game mechanic concepts discussed above is provided.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
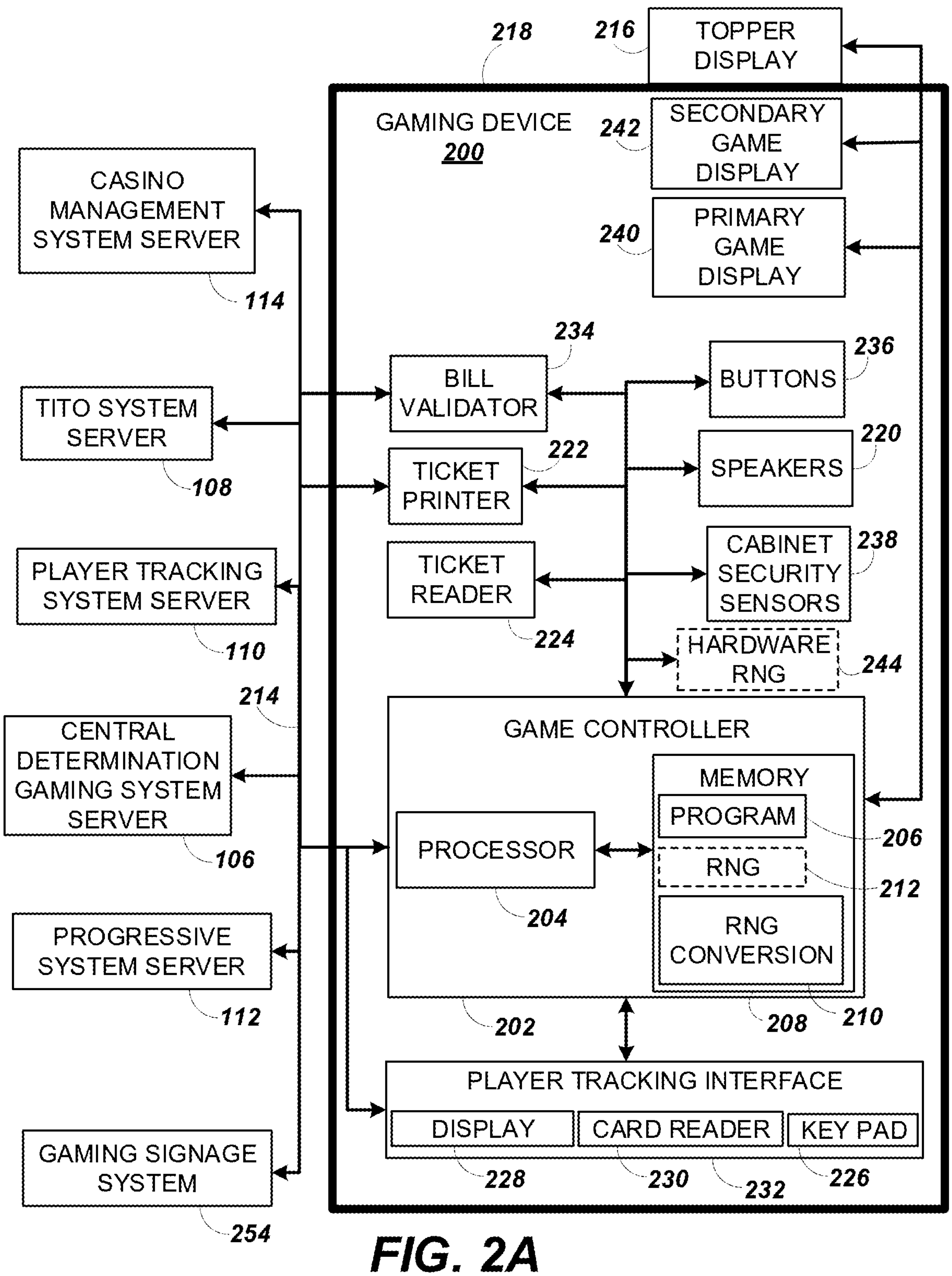
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows gameplay functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
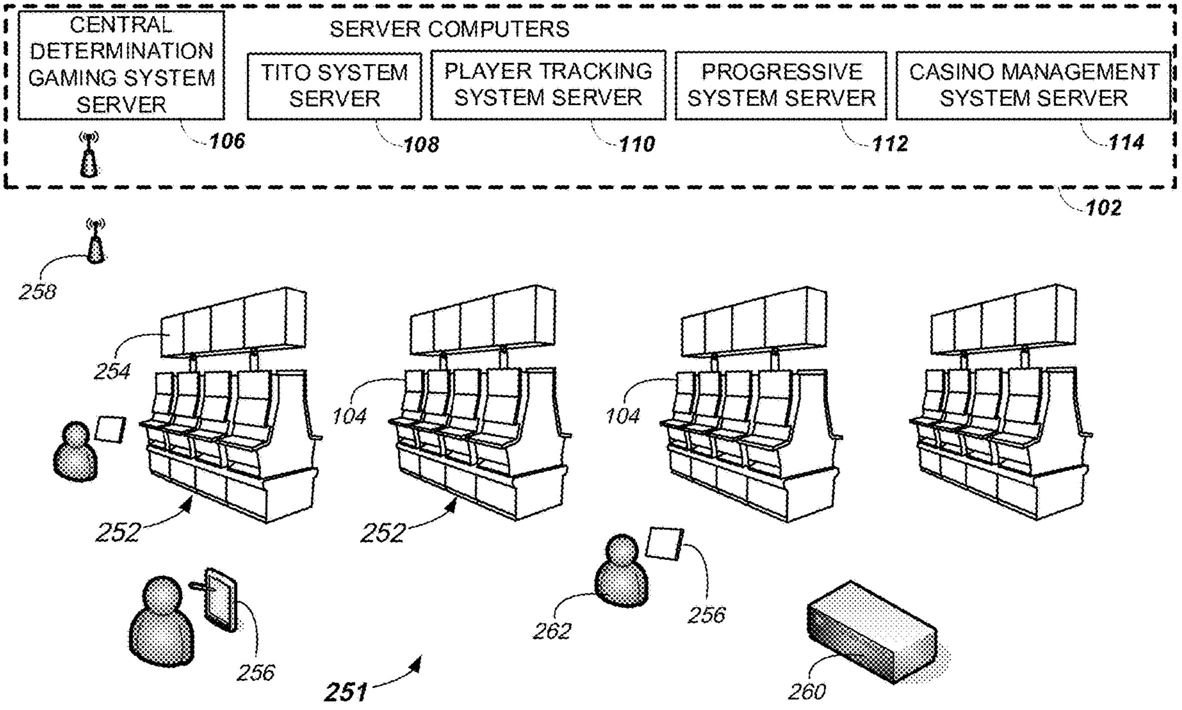
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
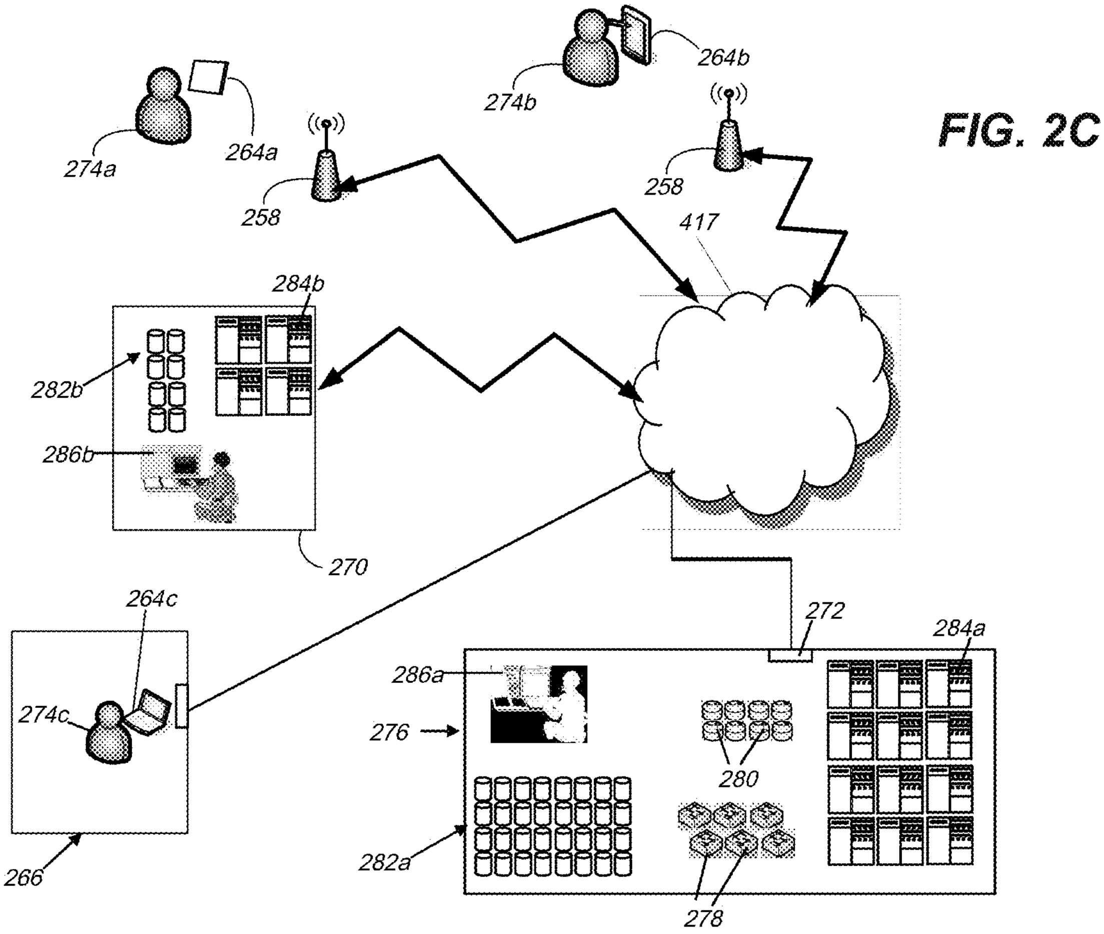
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
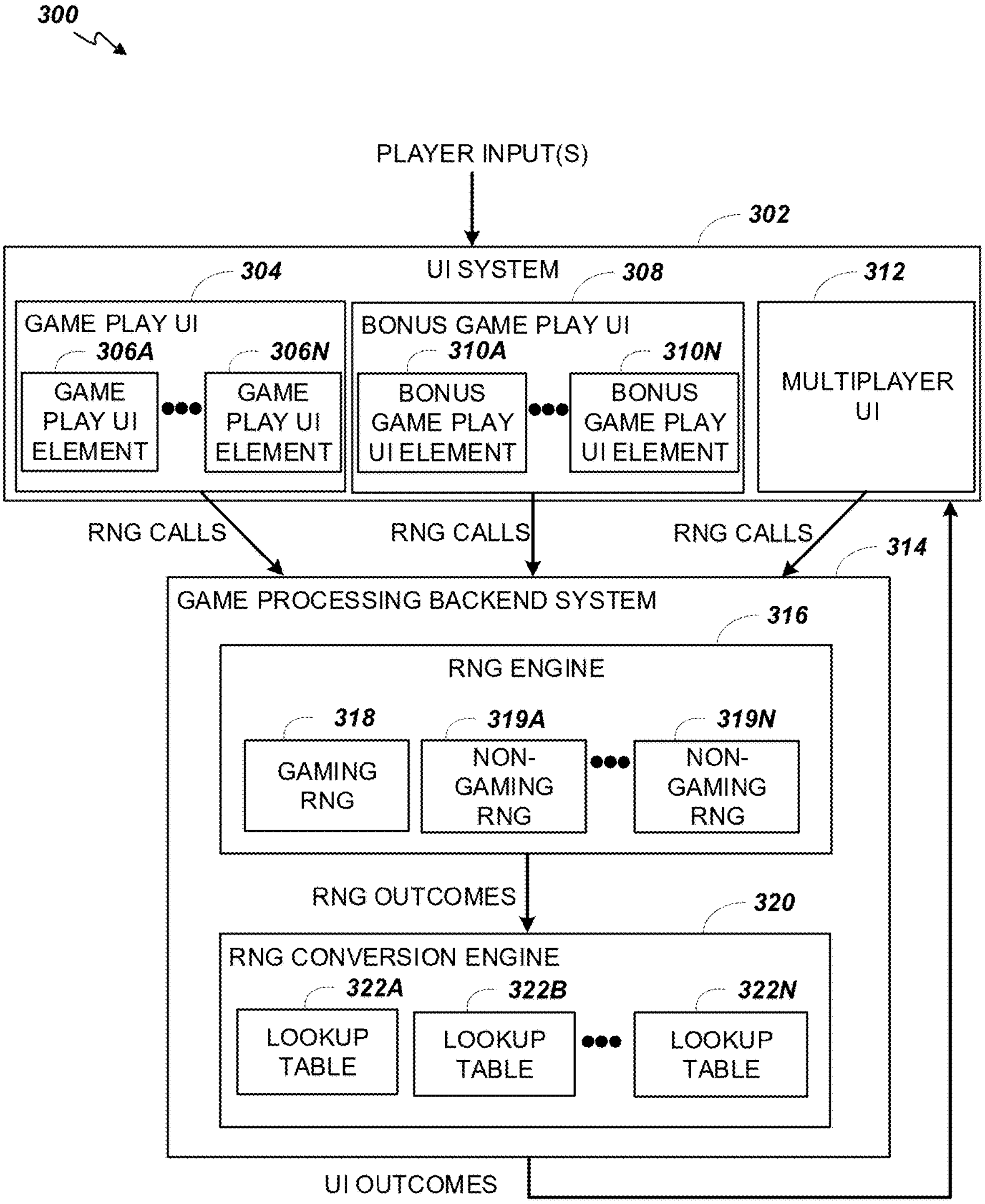
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more gameplay UIs 304, one or more bonus gameplay UIs 308, and one or more multiplayer UIs 312, where each UI type includes one or more mechanical UIs and/or graphical UIs (GUIs). In other words, gameplay UI 304, bonus gameplay UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as gameplay UI elements 306A-306N and bonus gameplay UI elements 310A-310N.

The gameplay UI 304 represents a UI that a player typically interfaces with for a base game. During a game instance of a base game, the gameplay UI elements 306A-306N (e.g., GUI elements depicting one or more virtual reels) are shown and/or made available to a user. In a subsequent game instance, the UI system 302 could transition out of the base game to one or more bonus games. The bonus gameplay UI 308 represents a UI that utilizes bonus gameplay UI elements 310A-310N for a player to interact with and/or view during a bonus game. In one or more implementations, at least some of the gameplay UI element 306A-306N are similar to the bonus gameplay UI elements 310A-310N. In other implementations, the gameplay UI element 306A-306N can differ from the bonus gameplay UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents gameplay information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more gameplay UI elements 306A-306N, such as symbols, for the gameplay UI 304. In another example, if the UI outcome is for a bonus game, the UI system could update one or more bonus gameplay UI elements 310A-310N (e.g., symbols) for the bonus gameplay UI 308. In response to updating the appropriate UI, the player may subsequently provide additional player inputs to initiate a subsequent game instance that progresses through the game processing pipeline.

Figure 7:
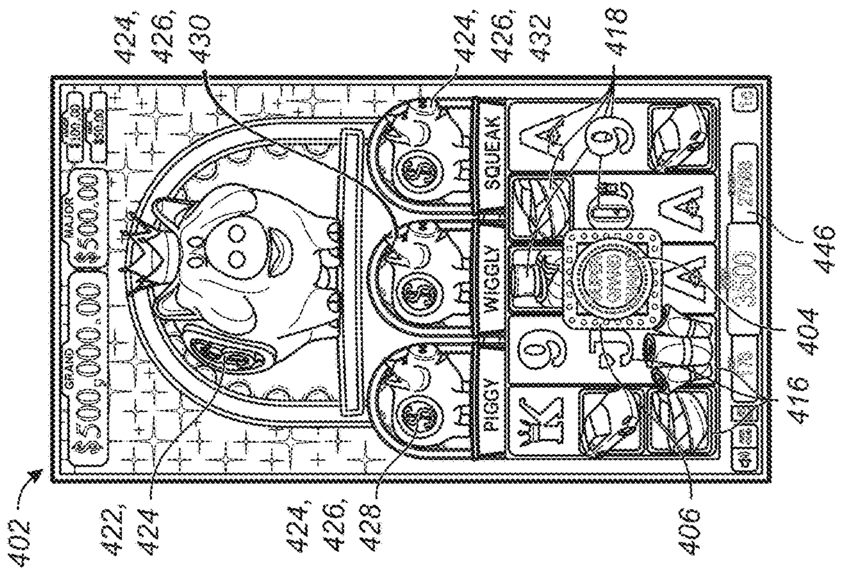
FIGS. 7 and 8 depict various stages of game play for one or more GUIs presenting a jackpot trigger symbol during base game play, with the jackpot trigger symbol triggering an instance of the jackpot chance game.
Figure 6:
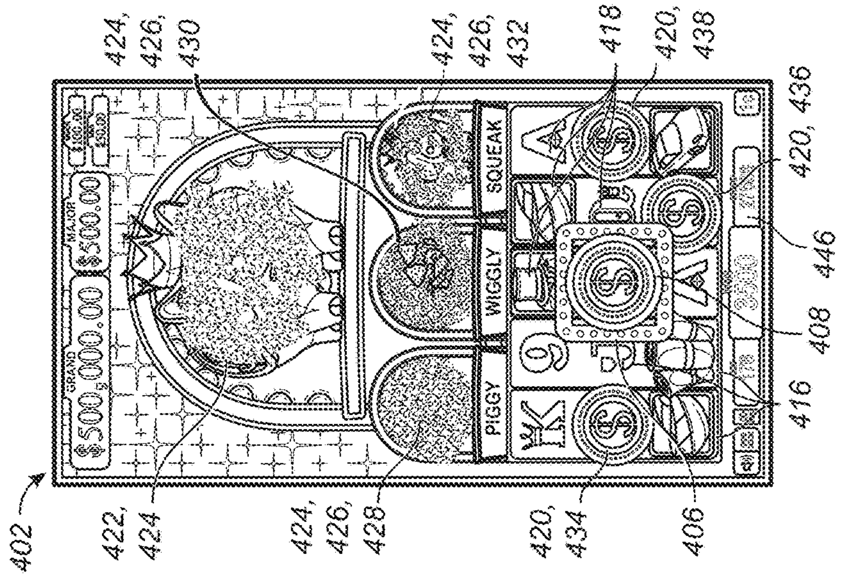
FIGS. 5 and 6 depict various stages of game play for one or more GUIs presenting a bonus symbol window capable of displaying, during base game play, a bonus metamorphic trigger symbol that may feed and trigger a bonus metamorphic indicator corresponding with a first instance of the feature game and a second instance of the feature game.
Figure 10:
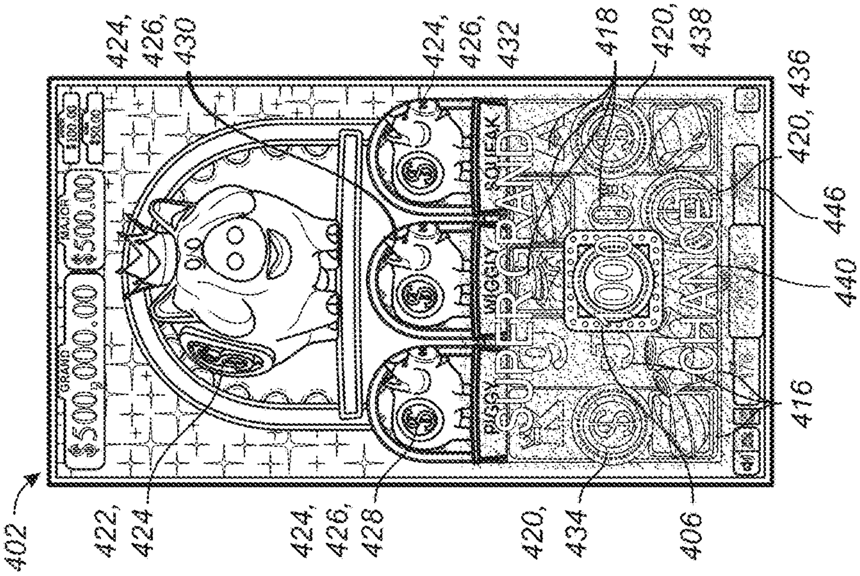
FIGS. 9 through 11 depict various stages of game play for one or more GUIs presenting stages of the jackpot chance game.
Figure 9:
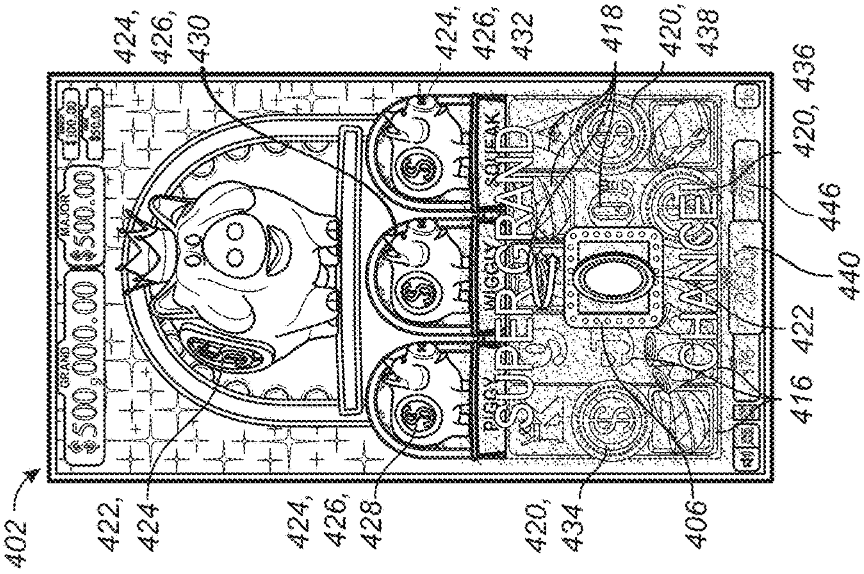
Figure 8:
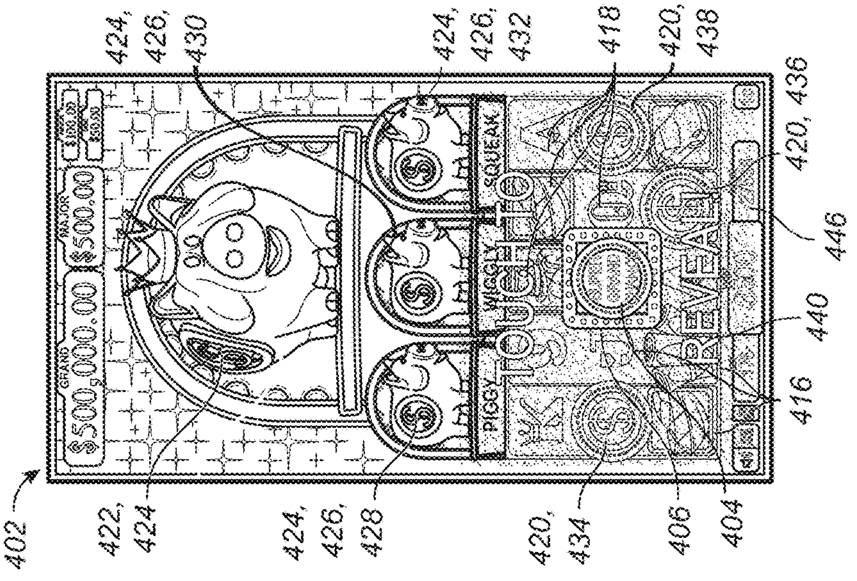
Figure 11:
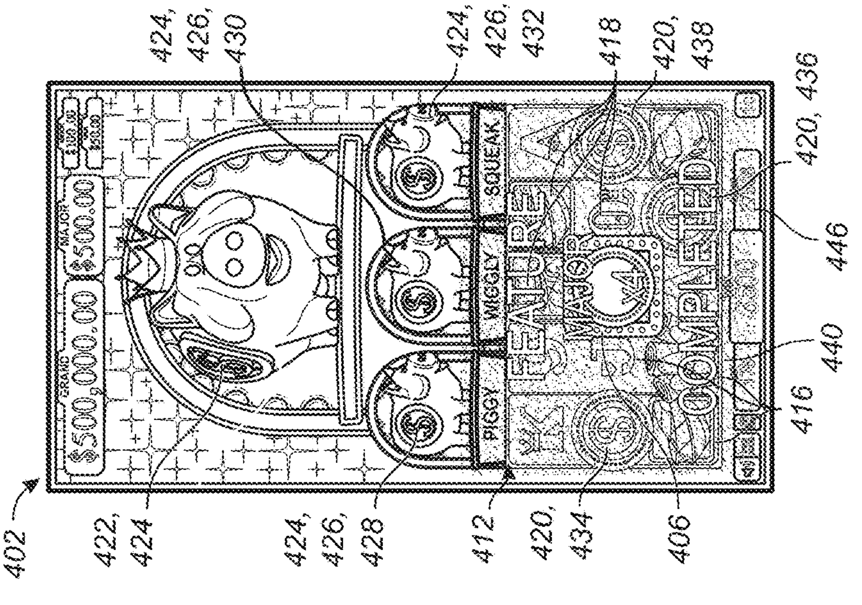
Figure 12:
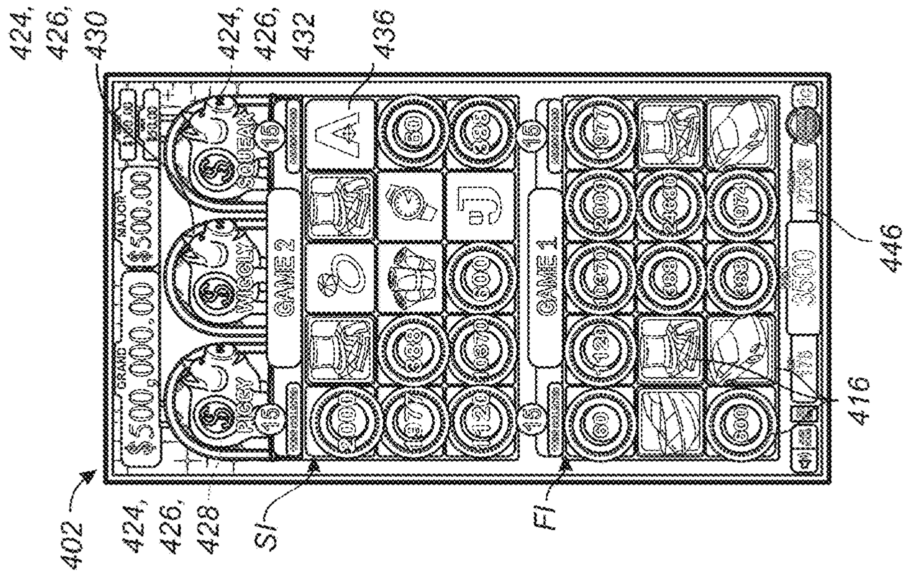
FIGS. 12 and 13 depict two stages of game play for the first instance of the feature game and the second instance of the feature game.
Figure 13:
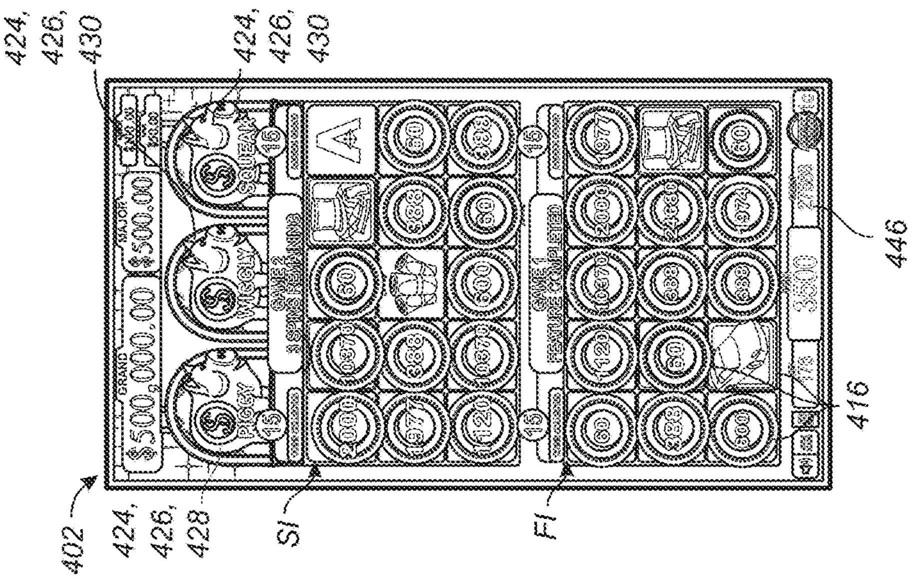
Figure 14:
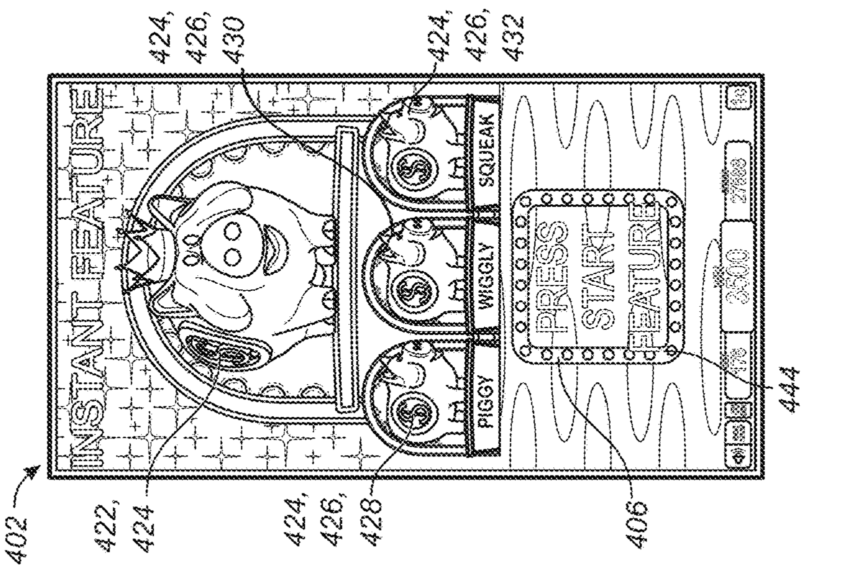
FIGS. 14 through 17 depict various stages of game play for one or more GUIs presenting, responsive to input from a player, an instant feature animation that concludes with an instant feature indicator being displayed in either a jackpot chance state or a feature game state.
Figure 19:
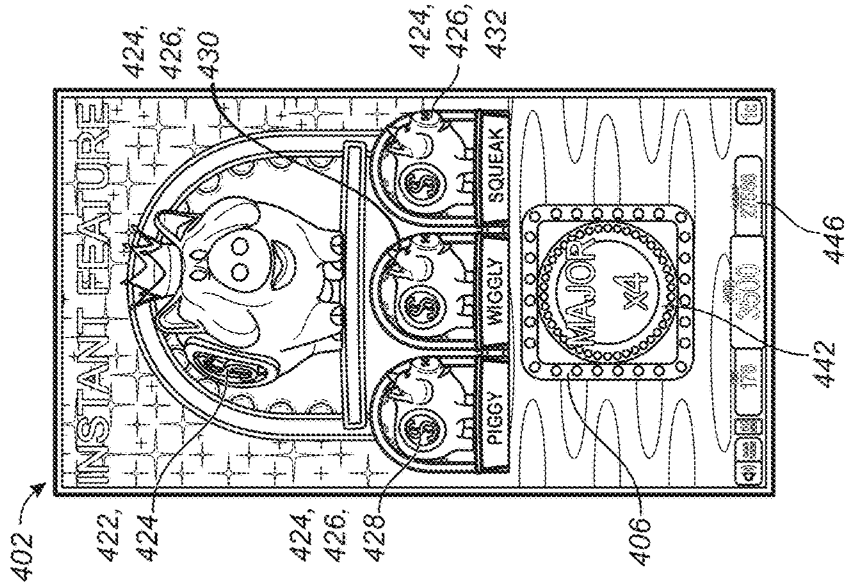
FIGS. 18 through 20 depict various stages of the instance of the jackpot chance game including an animation of the gold coin rotating about a longitudinal axis and transitioning through a plurality of prize states corresponding with a plurality of prizes increasing in value up to a jackpot.
Figure 18:
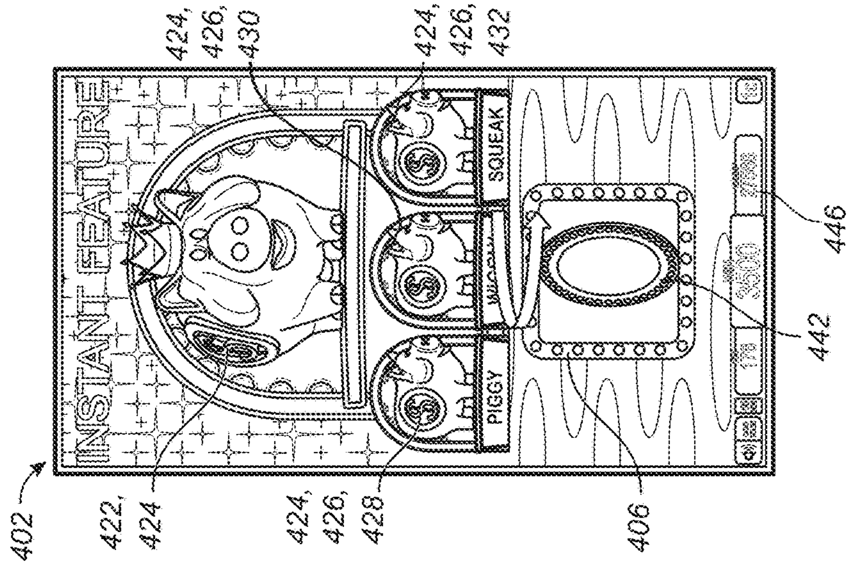
Figure 20:
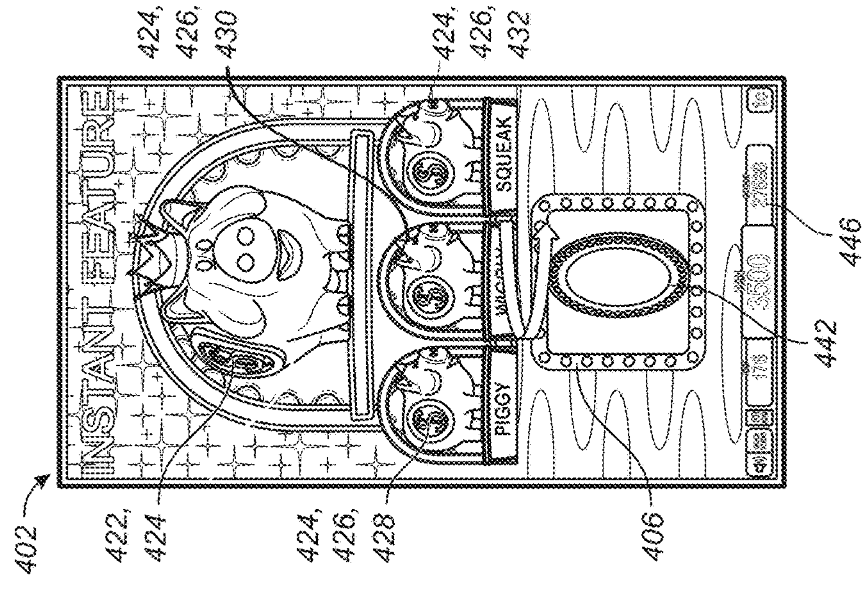
Figure 21:
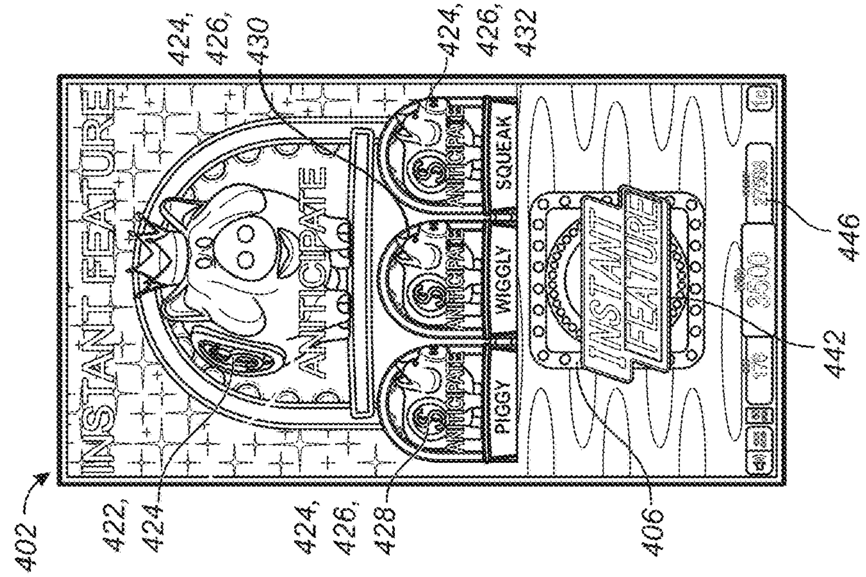
FIGS. 21 and 22 depict various stages corresponding with an introduction to the feature game.
Figure 22:
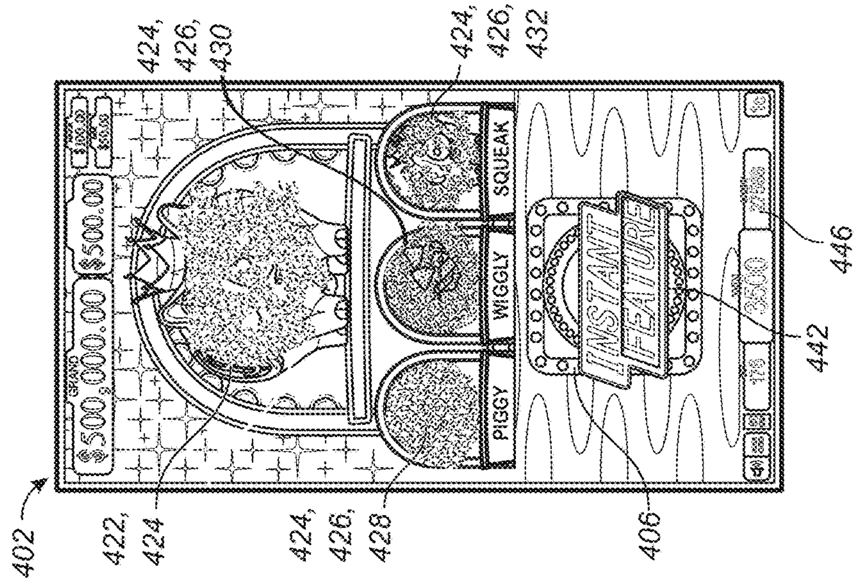
Figure 24:
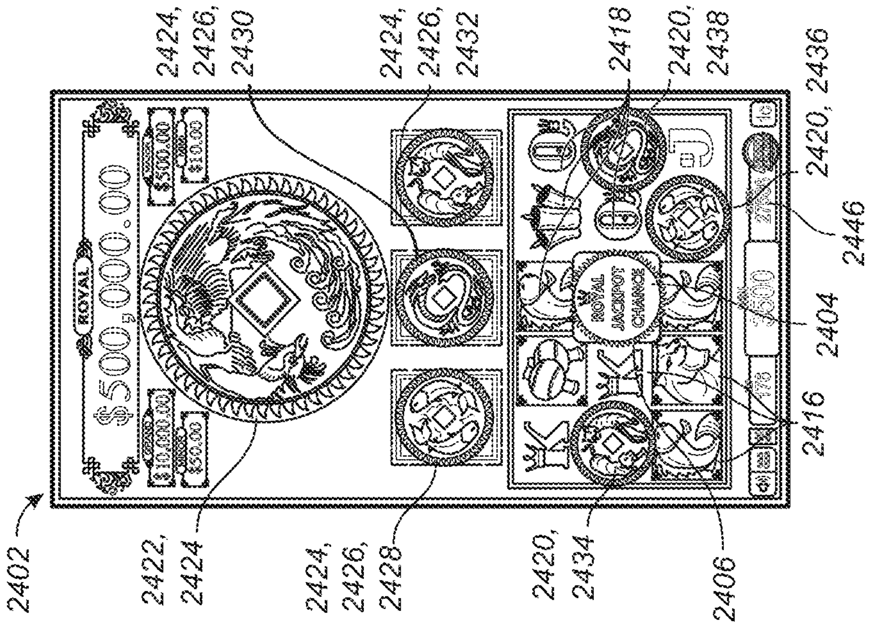
FIGS. 24 and 25 depict two stages for another example of the jackpot chance game initiated responsive to base game play.
Figure 23:
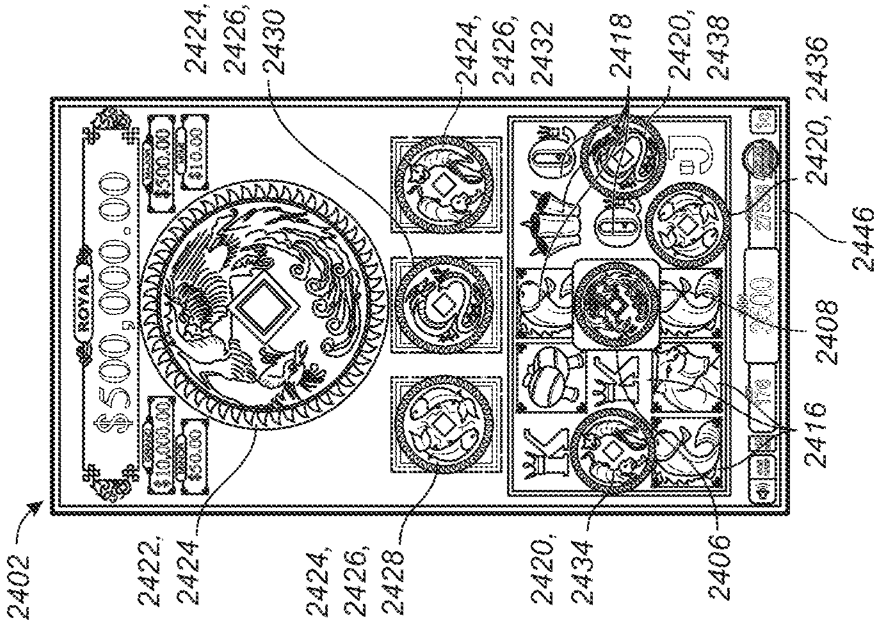
FIG. 23 depicts a stage for another example of base game play, illustrating the bonus symbol window displaying the bonus metamorphic trigger symbol.
Figure 25:
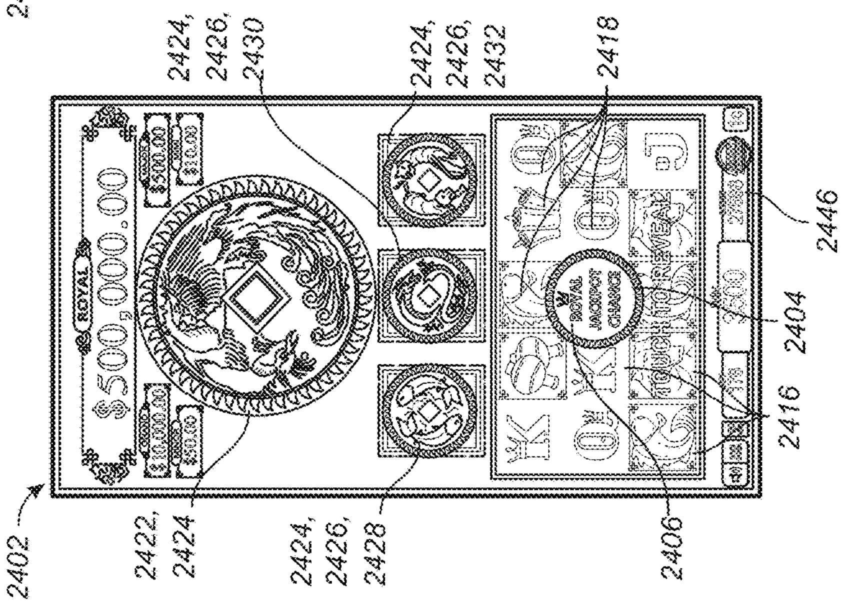
Figure 26:
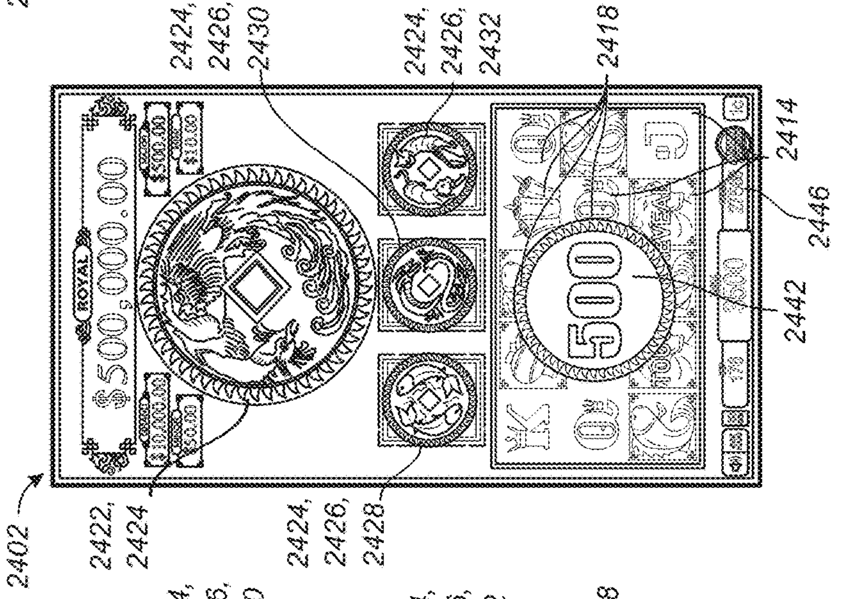
FIGS. 26 through 28 depict various stages for the instance of the jackpot chance game.
Figure 27:
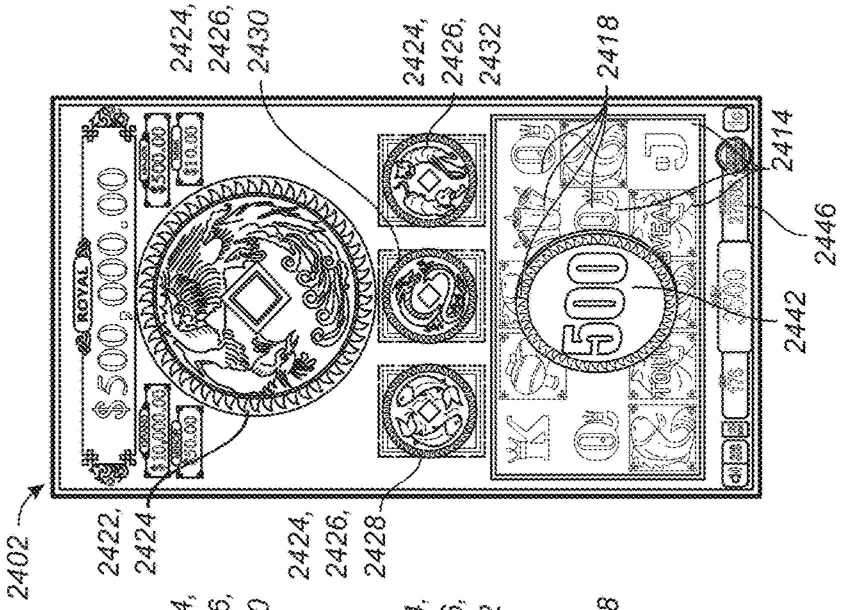
Figure 29:
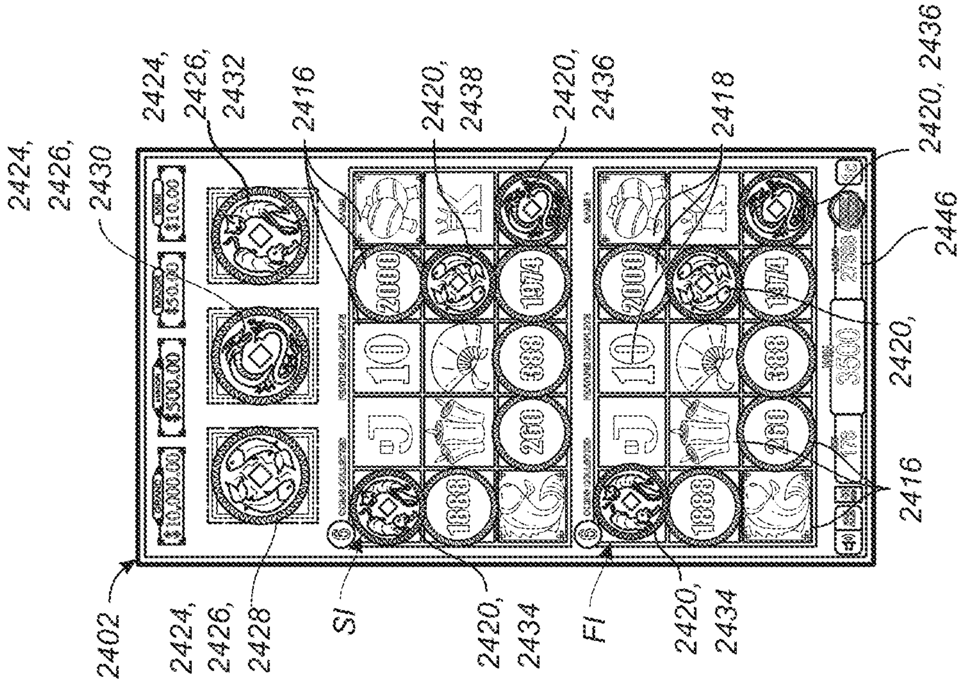
FIG. 29 depicts one stage of game play for one or more GUIs presenting random outcomes for two instances of the feature game.
Figure 28:
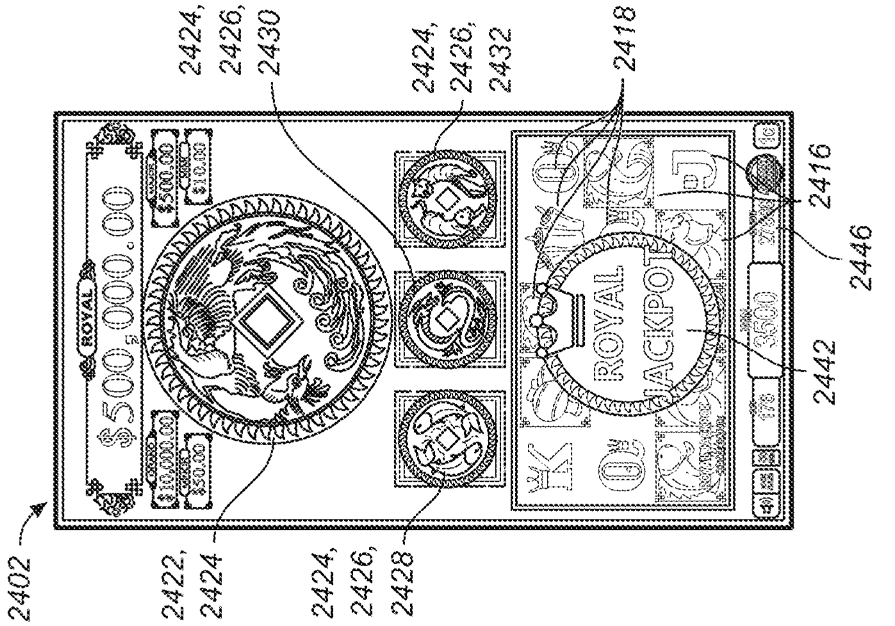
Figure 31:
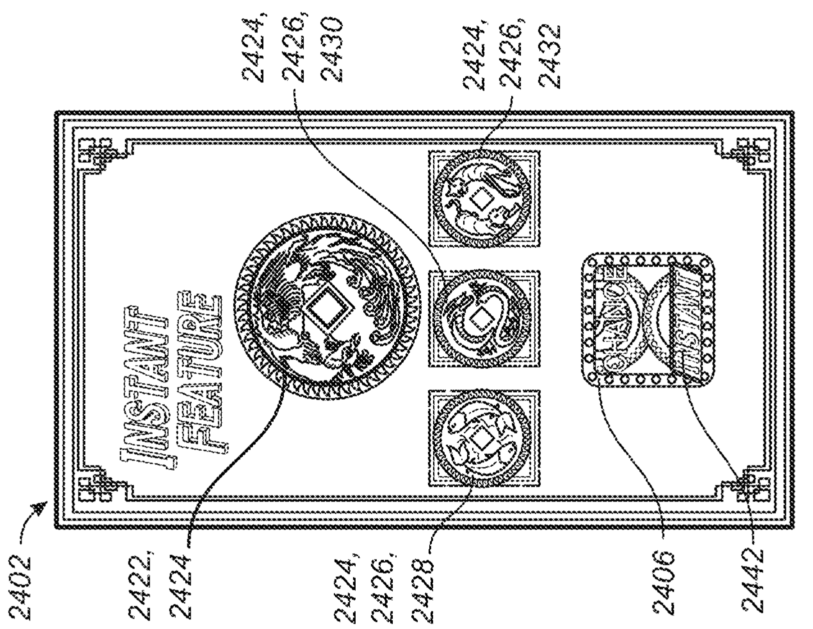
FIGS. 30 through 33 depict various stages of an instant feature animation that randomly concludes with an instant feature indicator being displayed in either a jackpot chance state or a feature game state.
Figure 30:
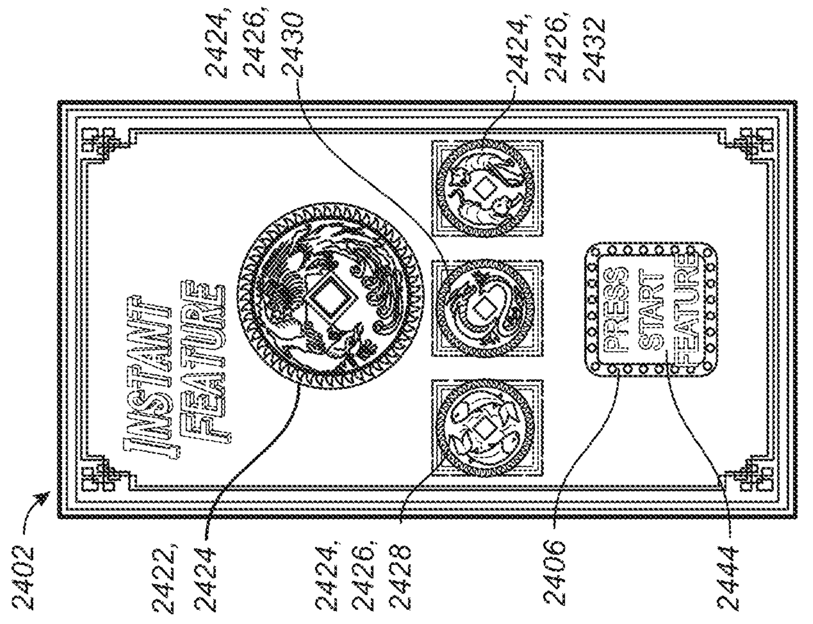
Figure 33:
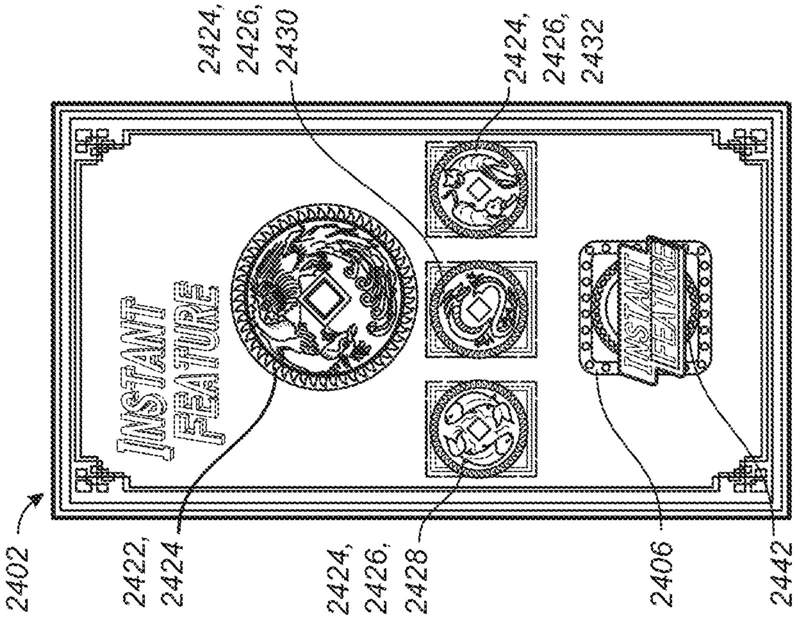
Figure 32:
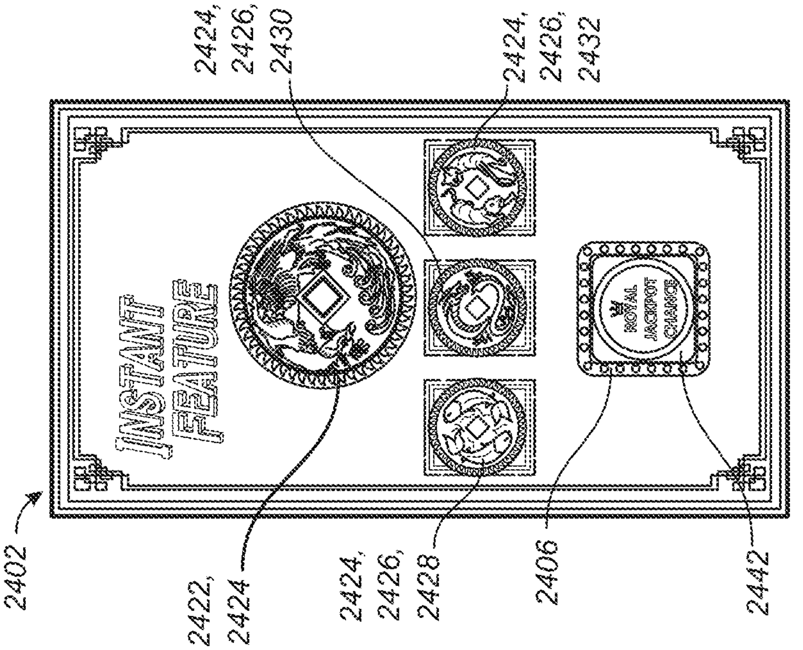

As discussed earlier, the present disclosure is directed to a system 100 (FIG. 4) having one or more GUIs 402 that may be used to present a base game, a feature game, and a jackpot chance game. To assist in this discussion, FIGS. 5 and 6 depict various stages of game play for one or more GUIs presenting a bonus symbol window capable of displaying, during base game play, a bonus metamorphic trigger symbol that may feed and trigger a bonus metamorphic indicator corresponding with a first instance of the feature game and a second instance of the feature game. FIGS. 7 and 8 depict various stages of game play for one or more GUIs presenting a jackpot trigger symbol during base game play, with the jackpot trigger symbol triggering an instance of the jackpot chance game. FIGS. 9 through 11 depict various stages of two instances of the feature game. FIGS. 12 and 13 depict two stages of game play for the first instance of the feature game and the second instance of the feature game. FIGS. 14 through 17 depict various stages of game play for one or more GUIs presenting, responsive to input from a player, an instant feature animation that randomly concludes with an instant feature indicator being displayed in either a jackpot chance state or a feature game state. FIGS. 18 through 20 depict various stages for the instance of the jackpot chance game including an animation of the gold coin rotating about a longitudinal axis and transitioning through a plurality of prize states corresponding with a plurality of prizes increasing in value up to a jackpot. FIGS. 21 and 22 depict various stages corresponding with an introduction to the feature game. FIGS. 23-33 depict another example of the GUIs of FIGS. 5-33.

Figure 4:
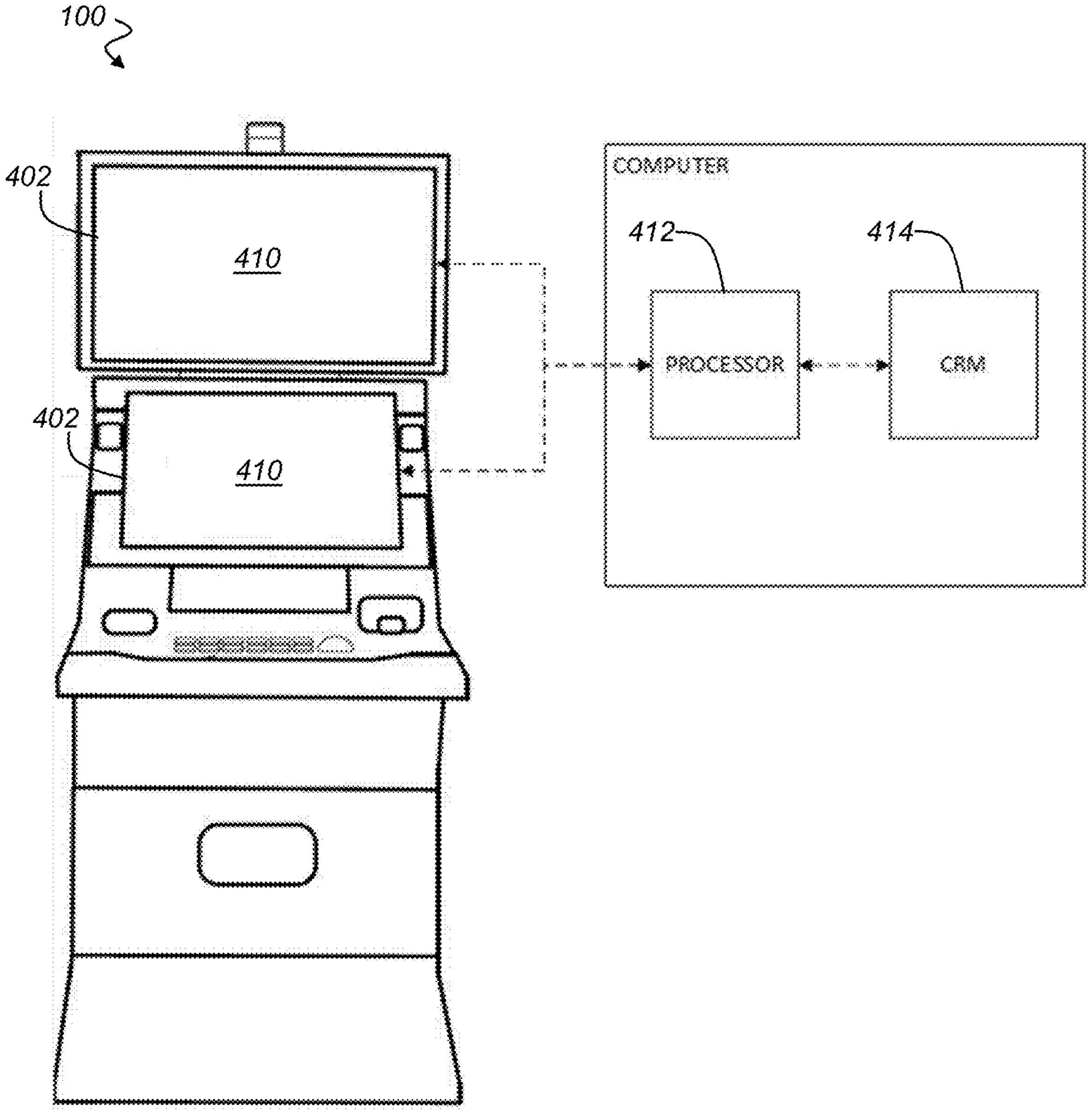
FIG. 4 is a block diagram of one example of the EGMs of FIG. 1, illustrating the EGM including a non-transitory computer readable storage medium, a processor, and one or more displays configured to present multiple symbols corresponding with a base game, a feature game, and a jackpot chance game.
Figure 5:
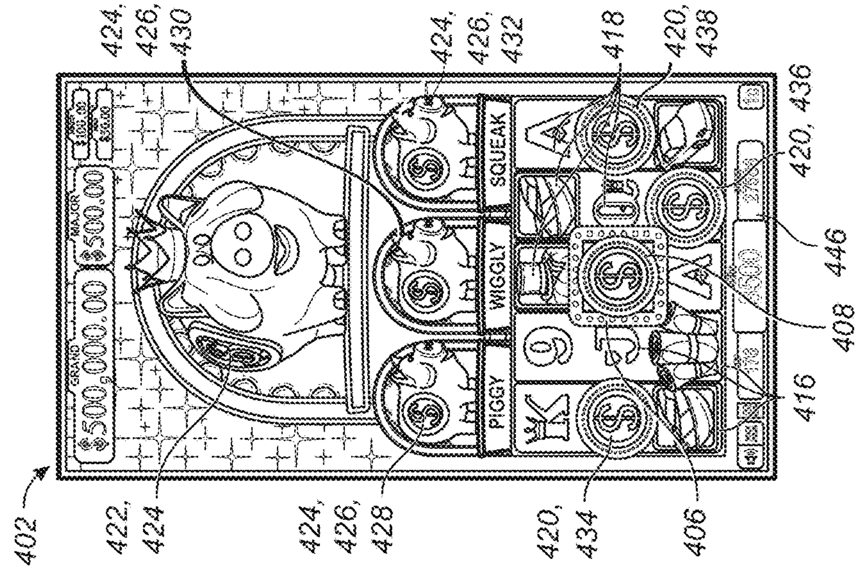

FIG. 4 depicts a block diagram of one example of the system 100 of FIG. 1. The system 100 includes one or one or more displays 410 configured to present one or more GUIs 402 as described in detail below. The system 100 may have one or more processors 412 and one or more memory devices 414 (e.g., non-transitory computer readable storage media). The memory device 414 may store computer-executable instructions which, when executed by the processor 412, cause the processor 412 to receive an input requesting play of a base game.

Referring to FIGS. 5 and 6, the one or more processors 412 may cause, during the base game, the one or more GUI 402*s* (FIG. 5) to present a plurality of symbol windows 416 including the bonus symbol window 406. The bonus symbol window 406 may display a symbol selected from a dedicated reel specific to only that bonus symbol window 406. The other symbol windows 416 may display symbols 418 selected from other reels that may provide symbols to multiple symbol windows 416. The symbol windows 416 may be arranged in columns, with each column of symbol windows displaying symbols selected from a corresponding reel, although the bonus symbol window 406 may display symbols selected from a reel other than the reel providing symbols to the other symbol windows 416 in the same column. The reel from which symbols are selected for display in the bonus symbol window may have certain symbols that are not included on any other reels. As described in detail below, symbols 418 that may be displayed in the bonus symbol window 406 include one or more Super SCAT symbols, such as a bonus metamorphic trigger symbol 408 and a jackpot trigger symbol 404, with only one of such symbols being displayed within the bonus symbol window 406 at a time. In some implementations, other symbols 418 that may be displayed in the bonus symbol window 406 may include a WILD symbol, Ace through 9 symbols, and/or picture symbols (e.g., five picture symbols). The processor 412 may cause, responsive to each play of the base game, a corresponding symbol to be selected, e.g., randomly, and displayed in each symbol window 416.

In such an implementation, the objective of the player in the base game is to obtain winning combinations of symbols, e.g., a winning combination of symbols 418 along a payline. The processor 412 may cause the GUI 402 to present the symbol windows 416, including the bonus symbol window 406. The processor 412 may cause, responsive to each play of the base game, the GUI 402 to present a corresponding symbol 418 in each symbol window 416. More specifically, the GUI 402 may present a 6-reel slot machine game including six reels, and each reel may generally have three symbol windows 416 in which to display symbols 418 (as mentioned above, the reel that includes the bonus metamorphic trigger symbol 408 or the jackpot trigger symbol 404 may have only one symbol window 416, the bonus symbol window 406, in which to display symbols 418 and the reel that includes the symbols 418 shown in the other symbol windows 416 in the same column as the bonus symbol window 418 may correspondingly have one less symbol window 416 than the reels for other columns of symbol windows 416 in which to display symbols). In other implementations, the GUI may allow for other sizes of reels, symbol windows, and other features. For a slot game with three rows and five columns of symbol windows 416, there are 243 paylines covering all possible 6-symbol combinations involving one symbol 418 from each of the five columns of symbols 418 and the bonus symbol window 406. The winning symbol combinations that may be obtained along such paylines may result in an award of credits or other items to a player that obtains such winning symbol combinations. The symbols 418 may further include one or more regular metamorphic trigger symbols 420 (e.g., a first regular metamorphic trigger symbol 434, a second regular metamorphic trigger symbol 436, a third regular metamorphic trigger symbol 438), which when displayed during the base game, may cause the processor 412 to randomly initiate an instance of the feature game with one or more feature game enhancements corresponding to the regular metamorphic trigger symbols 420 being displayed in the base game outcome by the one or more GUIs 402. The symbols 418 may further include the bonus metamorphic trigger symbol 408. The processor 412 may cause, responsive to the bonus symbol window 406 displaying the bonus metamorphic trigger symbol 408, a random determination to be made as to whether to initiate a first instance of the feature game including one or more feature game enhancements associated with the regular metamorphic indicators 426. As described in detail below, the symbols 418 may, in some base game outcomes, further include the jackpot trigger symbol 404, which when displayed in the bonus symbol window 406 during the base game, may cause the processor 412 to initiate an instance of the jackpot chance game.

The one or more GUIs 402 for the base game present five columns of symbol windows 416 (i.e., generally one column for each reel, although see above discussion regarding the sixth reel), and each symbol window 416 may, for example, serve as a placeholder in which a symbol 418 is displayed at the conclusion of a play of the base game. The symbols 418 may be selected from a plurality of different symbols 418 available for selection and display in the symbol windows 416. In one implementation, the bonus symbol window 406 displays the bonus metamorphic trigger symbol 408 (e.g., a gold coin depicted in FIG. 5 and accompanied by an animation showing a flow of particles from the gold coin to feed a bonus metamorphic indicator 422 to potentially trigger the feature game as described in detail below), the jackpot trigger symbol 404 (e.g., the gold coin in FIG. 6 with text or other indication of a chance to win a jackpot prize), or one of multiple other symbols as the result of a base game play. The processor 412 may cause the GUI 402 to display the bonus metamorphic trigger symbol 408 and jackpot trigger symbol 404 in only the bonus symbol window 406 (and not the other symbol windows). A random determination may be made in association with each game play as to whether the GUI 402 will potentially display the bonus metamorphic trigger symbol 408 or the jackpot trigger symbol 404 in the bonus symbol window 406. For example, the reel that has the symbols for the bonus symbol window 406 might have 20 symbols on it, one of which is a dynamic symbol that can, for each base game play, be configured to be either the bonus metamorphic trigger symbol 408 or the jackpot trigger symbol 404.

The symbol windows 416, other than the bonus symbol window 406, may display a plurality of regular metamorphic trigger symbols 420, which each represent a possibility that a feature game enhancement corresponding with each regular metamorphic trigger symbol 420 may be included in the feature game if the feature game is caused to be provided. The regular metamorphic trigger symbols 420 may include a first regular metamorphic trigger symbol 434 (e.g., a blue coin) with an associated first feature game enhancement that provides a predetermined credit value for the first regular metamorphic trigger symbol 434. For example, an instance of the feature game with the first feature game enhancement may display the first regular metamorphic trigger symbol 434 with an animation sequentially presenting one or more coin values, e.g., as the coin flips over one or more times, each newly revealed face may have a larger value than the previously revealed face. Each presented coin value in that play is larger than any credit value previously presented in that animation. The animation concludes with a final coin value larger than all previous coin values shown in the animation, at which point the first regular metamorphic trigger symbol transitions into a COR symbol having a credit value equal to the final coin value presented in the animation. The regular metamorphic trigger symbols 420 may further include a second regular metamorphic trigger symbol 436 (e.g., a red coin) with an associated second feature game enhancement that applies a multiplier to the displayed credit value of each of the COR symbols or other symbols having credit values. The regular metamorphic trigger symbols 420 may further include a third regular metamorphic trigger symbol 438 (e.g., green coin) with an associated third feature game enhancement for determining a sum of the displayed credit value of every other symbol and transitioning the third regular metamorphic trigger symbol 438 to a COR symbol (or other symbol) having a credit value equal to that sum. The examples discussed above are merely by way of example; in other implementations, the metamorphic trigger symbol(s) may have any color, symbol, object, animal, or other graphical element and have other enhancements than those discussed. The symbols 418 may also include other types of symbols, such as a cash-on-reel symbol (COR symbol), which may be represented by a money bag or coin that is common to all of the cash-on-reel symbols and an award value which may vary between COR symbols. For example, FIGS. 5 and 6 also depict symbols of another symbol type, e.g., boat symbols, car symbols, etc. While not depicted here, the symbols 418 selected for display in the symbol windows 416 may be of a variety of other different types, such as free spin symbol types (which may, in some cases, cause one or more free or additional plays of the base game to be awarded to the player when displayed), wild symbol types (which may act/be treated as any symbol of at least one other symbol type when displayed), etc. In some implementations, the regular metamorphic trigger symbols 420 may also serve as wild symbols, i.e., treated as equivalent to a plurality of other types of symbols at least for the purposes of determining winning symbol patterns in base game play.

The processor 412 may cause, in a base game outcome, the bonus metamorphic trigger symbol 408 or one or more regular metamorphic trigger symbols 420 displayed by the one or more GUIs 402 to be displayed. As described in detail below, the processor 412 may then make, responsive to the bonus metamorphic trigger symbol 408 or the one or more regular metamorphic trigger symbols being displayed by the one or more GUIs 402, a random determination of whether or not to transition one or more corresponding metamorphic indicators 424 to a triggered state (e.g., the piggy bank depicted in FIG. 7 emitting light above a predetermined luminosity, etc.). The metamorphic indicators 424 include the bonus metamorphic indicator 422 and a plurality of regular metamorphic indicators 426. Each regular metamorphic indicator 426 is associated with a different corresponding feature game enhancement.

The processor 412 may cause, responsive to the symbol 418 that is selected and displayed in the symbol window 416 being one of the metamorphic trigger symbols 424 (e.g., the bonus metamorphic trigger symbol 408, the regular metamorphic trigger symbol 420), a random determination to be made as to whether to transition one or more of the metamorphic indicators 424 that correspond to the displayed trigger symbol(s) to the triggered state and then initiate a first instance of the feature game. The feature game includes one or more feature game enhancements associated with the one or more regular metamorphic indicators 426 that are in the triggered state.

The metamorphic indicators 424 may, for example, potentially undergo periodic changes in graphical state responsive to their corresponding metamorphic triggering symbols being shown in a base game outcome. For example, the processor 412 may associate each metamorphic indicator 424 with a corresponding ordered sequence of graphical states. The processor 412 may cause each metamorphic indicator to potentially advance to the next graphical state in the ordered sequence, responsive to the GUI 402 displaying at the end of each base game play the regular metamorphic trigger symbol 420 that corresponds with the metamorphic indicator 424. For instance, the bonus metamorphic indicator 422 may be associated with an ordered sequence of graphical states depicting the gold piggy bank illuminating light at incrementally higher levels of luminosity until the gold piggy bank is displayed in the triggered state where the piggy bank is a profile emitting light above a predetermined luminosity. In another implementation, the bonus metamorphic indicator 422 may be associated with an ordered sequence of graphical states depicting a medallion radiating incrementally larger amounts of light until a ring of fire or plasma radiates outward from an edge of the medallion by a predetermined distance. In this implementation, the processor 412 makes the random determination to whether to initiate the first instance of the feature game independent of the graphical state of the metamorphic indicator 424. The metamorphic indicators 424 have a) a plurality of graphical states associated with indicator "growth" and b) (optionally) a "triggered" graphical state shown only when a feature game is to be provided using the enhancement associated with the metamorphic indicator(s) 424. Put another way, if a feature game is being provided, at least one (although not necessarily all) of the metamorphic indicators 424 must be shown in the triggered state. Conversely, if a metamorphic indicator 424 is shown in the triggered state, the feature game will be provided.

The processor 412 may, during play of the base game, cause one or more of the metamorphic indicators 424 to be displayed in the triggered state responsive, at least in part, to the corresponding regular metamorphic trigger symbol(s) 420 being displayed in the base game outcome by the one or more GUIs 402. In one implementation, the regular metamorphic indicators 426 may include a first regular metamorphic indicator 428 (e.g., a blue piggy bank), and the processor 412 may cause the one or more GUIs 402 to display an animation of a flow of particles from the first regular metamorphic trigger symbol 434, if displayed, to the first regular metamorphic indicator 428. The regular metamorphic indicators 426 may further include a second regular metamorphic indicator 430 (e.g., a red piggy bank), and the processor 412 may cause the GUI 402 to present an animation of a flow of particles from the second regular metamorphic trigger symbol 436, if displayed, to the second regular metamorphic indicator 430. The regular metamorphic indicators 426 may further include a third regular metamorphic indicator 432 (e.g., a green piggy bank) and the processor 412 may cause the GUI 402 to present an animation of a flow of particles from the third regular metamorphic trigger symbol 438, if displayed, to the third regular metamorphic indicator 432. The processor 412 may cause the GUI 402 to present an animation of a flow of particles from the bonus metamorphic trigger symbol 408, if displayed, to the bonus metamorphic indicator 422. In other implementations, the bonus metamorphic indicator 422 and the regular metamorphic indicators 426 may have other suitable graphical elements related to any color, symbol, object, animal, or other graphical element.

The bonus metamorphic indicator, when triggered, is triggered in tandem with a random or semi-random selection of one or more regular metamorphic indicators. For instance, when the bonus metamorphic trigger symbol 408 and the first regular metamorphic trigger symbol 434 are displayed in a base game outcome and the bonus metamorphic indicator 422 (e.g., a gold piggy bank) is caused to be displayed in the triggered state, the processor 412 may cause the GUI 402 to further display in the triggered state: the first regular metamorphic indicator 428 (e.g., a blue piggy bank), a combination of the first regular metamorphic indicator 428 and the second regular metamorphic indicator 430 (e.g., a red piggy bank), a combination of the first regular metamorphic indicator 428 and the third regular metamorphic indicator 432 (e.g., the green piggy bank), or a combination of the first regular metamorphic indicator 428, the second regular metamorphic indicator 430, and the third regular metamorphic indicator 432. The processor 412 may initiate the instance of the feature game, with each of the feature game enhancements corresponding with the one or more metamorphic trigger indicators in the triggered state.

When the bonus metamorphic trigger symbol 408 and the second regular metamorphic trigger symbol 436 are displayed and the bonus metamorphic indicator 422 is displayed in the triggered state, the processor 412 may cause the GUI 402 to further display in the triggered state: the second regular metamorphic indicator 430, a combination of the second regular metamorphic indicator 430 and the first regular metamorphic indicator 428, a combination of the second regular metamorphic indicator 430 and the third regular metamorphic indicator 432, or a combination of the first regular metamorphic indicator 428, the second regular metamorphic indicator 430, and the third regular metamorphic indicator 432. The processor 412 may initiate the instance of the feature game, with each of the feature game enhancements corresponding with the one or more metamorphic trigger indicators in the triggered state.

When the bonus metamorphic trigger symbol 408 and the third regular metamorphic trigger symbol 438 are displayed and the bonus metamorphic indicator 422 is displayed in the triggered state, the processor 412 may cause the GUI 402 to further display in the triggered state: the third regular metamorphic indicator 432, a combination of the third regular metamorphic indicator 432 and the first regular metamorphic indicator 428, a combination of the third regular metamorphic indicator 432 and the second regular metamorphic indicator 430, or a combination of the first regular metamorphic indicator 428, the second regular metamorphic indicator 430, or the third regular metamorphic indicator 432. The processor 412 may initiate the instance of the feature game, with each of the feature game enhancements corresponding with the one or more metamorphic trigger indicators in the triggered state.

When the bonus metamorphic trigger symbol 408, the first regular metamorphic trigger symbol 434 and the second regular metamorphic trigger symbol 436 are displayed and the bonus metamorphic indicator 422 is displayed in the triggered state, the processor 412 may cause the GUI 402 to further display in the triggered state: the first regular metamorphic indicator 428, a combination of the first regular metamorphic indicator 428 and the second regular metamorphic indicator 430, a combination of the first regular metamorphic indicator 428 and the third regular metamorphic indicator 432, a combination of the first regular metamorphic indicator 428, the second regular metamorphic indicator 430, and the third regular metamorphic indicator 432, the second regular metamorphic indicator 430, or a combination of the second regular metamorphic indicator 430 or the third regular metamorphic indicator 432. The processor 412 may initiate the instance of the feature game, with each of the feature game enhancements corresponding with the one or more metamorphic trigger indicators in the triggered state.

When the bonus metamorphic trigger symbol 408, the second regular metamorphic trigger symbol 436 and the third regular metamorphic trigger symbol 438 are displayed and the bonus metamorphic indicator 422 is displayed in the triggered state, the processor 412 may cause the GUI 402 to further display in the triggered state: the second regular metamorphic indicator 430, a combination of the first regular metamorphic indicator 428 and the second regular metamorphic indicator 430, a combination of the second regular metamorphic indicator 430 and the third regular metamorphic indicator 432, a combination of the first regular metamorphic indicator 428, the second regular metamorphic indicator 430, and the third regular metamorphic indicator 432, the third regular metamorphic indicator 432, or a combination of the first and the third regular metamorphic indicators 428, 432. The processor 412 may initiate the instance of the feature game, with each of the feature game enhancements corresponding with the one or more metamorphic trigger indicators in the triggered state.

When the bonus metamorphic trigger symbol 408 is presented and the bonus metamorphic indicator 422 is displayed in the triggered state without any regular metamorphic trigger symbols being displayed, the processor 412 may randomly cause the GUI 402 to display in the triggered state: the first regular metamorphic indicator 428, the second regular metamorphic indicator 430, the third regular metamorphic indicator 432, or any combination thereof.

The processor 412 may then initiate the instance of the feature game with each of the feature game enhancements corresponding with the one or more metamorphic trigger indicators in the triggered state.

As shown in FIGS. 12 and 13, the processor 412 may cause, in association with causing the one or more metamorphic indicators 424 to be displayed in the triggered state and determining the corresponding feature game enhancements, a first instance FI of the feature game to be presented by the one or more GUIs 402. The first instance FI of the feature game includes the corresponding feature game enhancement for each regular metamorphic indicator 426 that was caused to be displayed in the triggered state in association with initiation or presentation of the first instance FI of the feature game. The one or more processors 412 may further cause, in association with causing the bonus metamorphic indicator 422 to be displayed in the triggered state, a second instance SI of the feature game to be presented by the one or more GUIs 402. The second instance SI of the feature game includes the corresponding feature game enhancement for each regular metamorphic indicator that was caused to be displayed in the triggered state in association with presentation of the first instance FI of the feature game. In this implementation, the processor 412 may cause the GUI 402 to simultaneously present the first instance FI of the feature game and the second instance SI of the feature game. In another implementation, the processor 412 may cause the one or more GUIs 402 to serially present the first instance FI of the feature game and the second instance SI of the feature game. The first instance FI and the second instance SI of the feature game may start or be initialized with the same pattern of symbols 418, and the outcomes for each of the first instance FI and the second instance SI may be determined independently from one another, with the ultimate outcomes of both instances potentially being quite different. FIG. 12 shows the GUI 402 immediately after the two instances of the hold-and-spin game have been initiated, but before there has been any hold-and-spin game play. In FIG. 13, at least three plays of the feature game have concluded, with Game 1 being shown as "completed" and the spin counter for Game 2 being reset due to a new "held" symbol (not shown) being presented in the most recent hold-and-spin outcome.

In this implementation, the processor 412 may further cause the GUI 402 to present emphasis on the bonus symbol window 406 and the symbol 418 presented therein (e.g., a higher brightness of the bonus symbol window 406, a lower brightness of the symbol window surrounding the bonus symbol window 406, etc.). In one example, a translucent layer 440 may at least partially obscure the symbol windows 416 surrounding the bonus symbol window 406 when the GUI 402 presents the jackpot values during the jackpot chance game.

Figure 15:
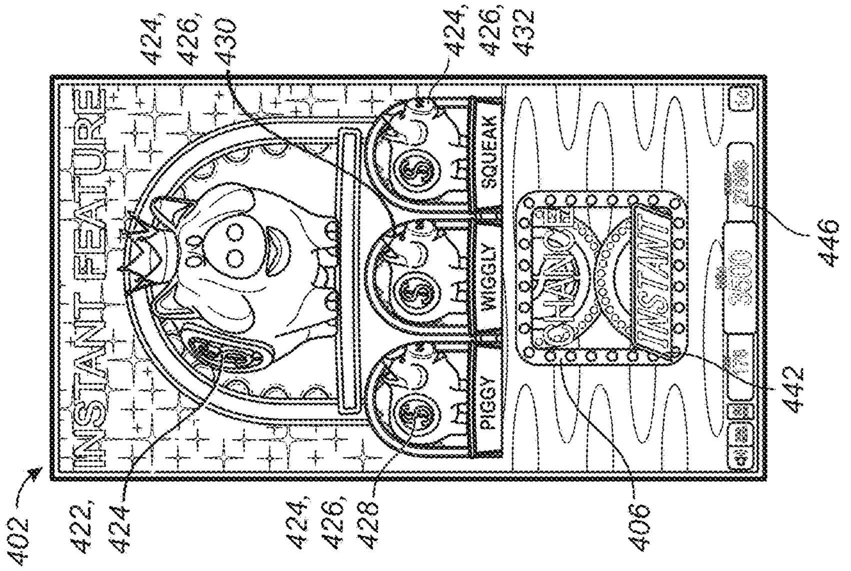
Figure 16:
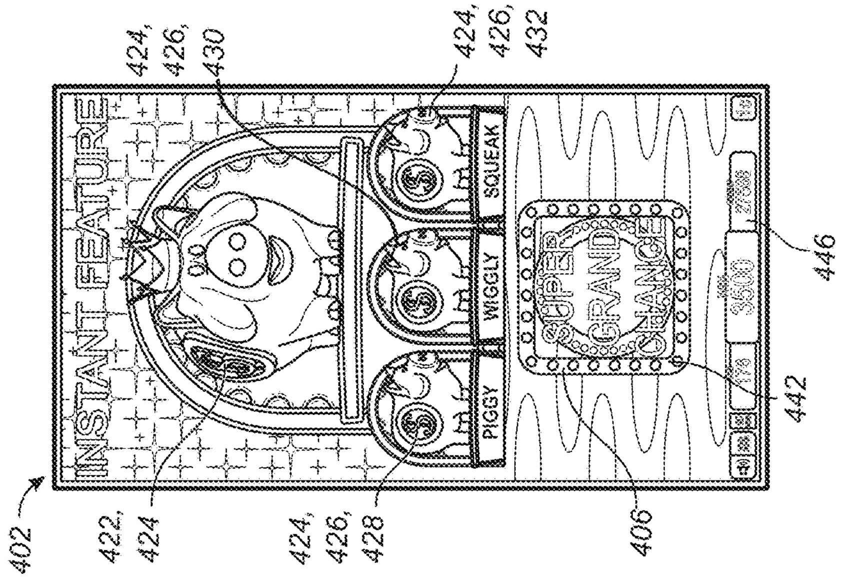
Figure 17:
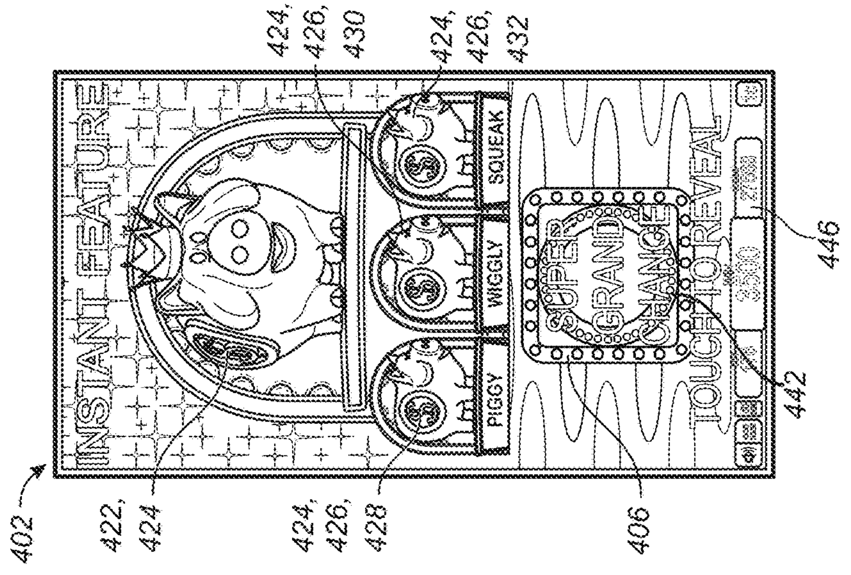

During the base game, the processor 412 may receive, from the player, an input indicating a request for on-demand play of the feature game and a chance to play the jackpot chance game (the request may be accompanied by a payment from the user, e.g., by the user applying a credit value from a balance owed to the user, etc.), such that the player does not have to wait until the processor 412 randomly initiates the feature game or the jackpot chance game. Based on the processor 412 receiving the input, the processor 412 may cause the GUI 402 to present an instant bonus prompt symbol 444 (e.g., a "PRESS START" feature symbol or text in FIG. 14). The processor 412 may further cause the GUI 402 to present an instant feature animation, responsive to the processor 412 receiving additional input from the user (e.g., the user touching a portion of a touchscreen presenting the PRESS START feature symbol, the user pressing a button on a button deck electrically communicating with the processor, the user speaking a voice command detected by a microphone electrically communicating with the processor, the user making a gesture detected by a camera electrically communicating with the processor, etc.). As shown in FIGS. 15-17, the processor 412 may cause, responsive to receipt of the input, the one or more GUIs 402 to present an instant feature animation that concludes with an instant feature indicator 442 being displayed in either a jackpot chance state (FIG. 16) or a feature game state (e.g., a symbol of FIG. 22 with the text "INSTANT FEATURE").

The processor 412 may initiate, based on the instant feature animation concluding with the instant feature indicator 442 in the jackpot chance state, an instance of the jackpot chance game. As discussed earlier, for each instance of the jackpot chance game, the one or more GUIs 402 are caused to sequentially present one or more jackpot values. Each presented jackpot value in the instance of the jackpot chance game is larger than any jackpot value previously presented in the instance of the jackpot chance game. The jackpot value presented at the conclusion of the instance of the jackpot chance game is caused to be added to a credit meter 446 displayed by the one or more GUIs 402.

The processor 412 may, regardless of whether or not the jackpot chance game is triggered and based on the input indicating the request for on-demand play of the feature game, cause one or more of the metamorphic indicators 424 to be displayed by the one or more GUIs 402 in a triggered state. Continuing with the present implementation, the metamorphic indicators 424 include the bonus metamorphic indicator 422 and the regular metamorphic indicators 426. The processor 412 may randomly cause one or more of the regular metamorphic indicators 426 (e.g., the blue piggy bank, the red piggy bank, the green piggy bank, etc.) to trigger and optionally cause the bonus metamorphic indicator 422 to trigger (also random). In FIG. 21, the text "ANTICIPATE" represents any animation, symbol, or image corresponding with the triggered metamorphic indicator being in transition, prior to the corresponding metamorphic indicator fully transitioning to the triggered state. For example, when all of the regular metamorphic indicators 426 and the bonus metamorphic indicator 422 are triggered, FIG. 21 may display an animation of each corresponding piggy bank shaking, growing, or undergoing another transition prior to each being displayed in the triggered state in FIG. 22. Each metamorphic indicator 424 continues to be associated with a different corresponding feature game enhancement (e.g., a predetermined credit value, the multiplier, the summing feature, etc.).

In this implementation, FIG. 22 depicts that all metamorphic indicators 424 (the bonus metamorphic indicator 422 and all the regular metamorphic indicators 426) have transitioned to the triggered state, responsive to the input indicating the request for on-demand play of the feature game. The processor 412 may then initiate a first instance FI of the feature game and a second instance SI of the feature game with any combination of the feature game enhancements associated with the triggered metamorphic indicators 424.

Referring to FIGS. 24-34, various stages of game play for another example GUI 2402 are somewhat similar to those of the GUI 402 of FIGS. 5-23. To avoid undue repetition, elements in the implementation of FIGS. 24-34 that are analogous to elements shown in FIGS. 5-23 are called out with numbers that share the same last two digits as those analogous elements in FIGS. 5-23. Thus, the discussion provided above with respect to the elements of the implementation of FIGS. 5-23 will be understood to be equally applicable to the analogous elements in FIGS. 24-35 unless indicated otherwise. In the interest of conciseness, discussion of these elements that would be redundant of earlier discussion herein of similar elements is not provided, with the understanding that the earlier discussion of such elements is applicable to these similar elements in FIGS. 24-34.

While the regular metamorphic indicators 426 of FIGS. 5-22 include a first pig with red features, a second pig with blue features, a third pig with green features, the regular metamorphic indicators 2426 of FIGS. 24-29 and 31-34 include a red coin, a blue coin, and a green coin. Furthermore, the bonus metamorphic indicator 422 of FIGS. 5-22 differs from that of FIGS. 24-29 and 31-34 in that the bonus metamorphic indicator 422 of FIGS. 5-22 is the fourth pig with gold features, and the bonus metamorphic indicator 2422 of FIGS. 24-29 and 31-34 is a fourth coin with gold features.

Figure 34:
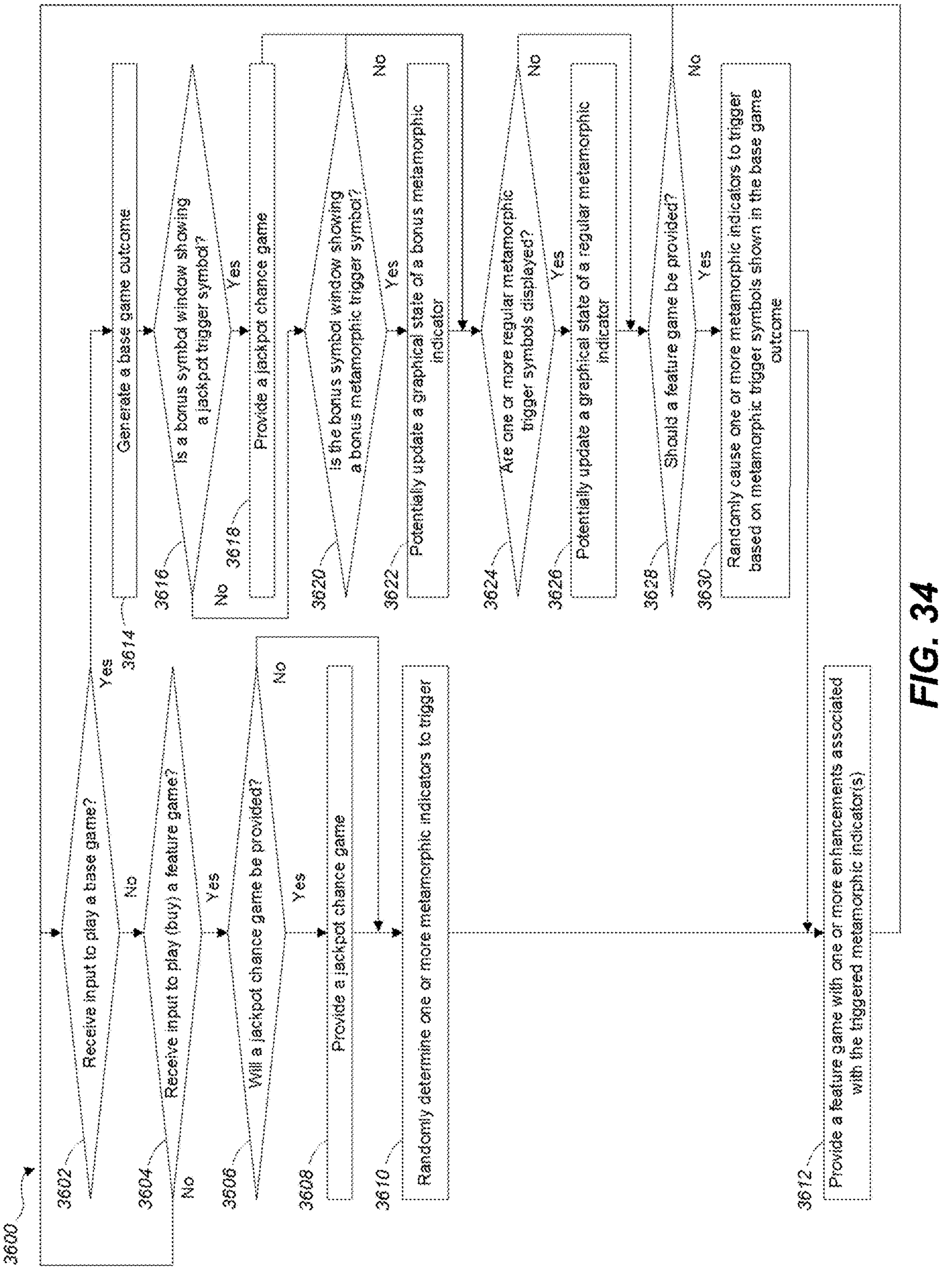
FIG. 34 depicts a flow chart of one example of a method of operating the system of FIG. 4.

Referring to FIG. 34, an example of a method 3600 is provided for operating the system 100 of FIG. 4. The method 3600 begins at block 3602 with the processor 412 determining whether the processor 412 received an input to play the base game. In one implementation, the user purchases or applies credit for one or more on-demand spins or plays of the base game. If the processor 412 received the input to play the base game, the method 3600 then proceeds to block 3612. If the processor 412 did not receive the input to play the base game, the method 3600 proceeds to block 3604.

At block 3604, the method 3600 includes the processor 412 determining whether the processor 412 received an input to play (e.g., buy) the feature game. Somewhat analogous to block 3602, the one or more processors 412 may determine whether the user purchased or applied credit for one or more on-demand spins or plays of the feature game. If the processor 412 received the input to play the feature game, the method 3600 then proceeds to block 3606. If the processor 412 did not receive the input to play the feature game, the method 3600 returns to block 3602.

At block 3606, the method 3600 includes determining, using the one or more processors 412, whether the jackpot chance game will be provided. If the one or more processors 412 determines that the jackpot chance game will be provided, the method 3600 proceeds to block 3608. If the one or more processors 412 determines that the jackpot chance game will not be provided, the method 3600 proceeds to block 3610.

At block 3608, the method 3600 includes providing, using the one or more processors 412, the jackpot chance game. In this implementation, for each instance of the jackpot chance game, the one or more GUIs 402 are caused to sequentially present one or more jackpot values. Each presented jackpot value in the instance of the jackpot chance game is larger than any jackpot value previously presented in the instance of the jackpot chance game. The jackpot value presented at the conclusion of the instance of the jackpot chance game is caused to be added to the credit meter 446 displayed by the one or more GUIs 402. The method 3600 then proceeds to block 3610.

At block 3610, the method 3600 includes randomly determining, using the one or more processors 412, which metamorphic indicators to transition to the triggered state. The one or more processors 412 then cause one or more the metamorphic indicators 424 displayed by the one or more GUIs 402 to be displayed in a triggered state. The plurality of metamorphic indicators 424 includes the bonus metamorphic indicator 422 and the regular metamorphic indicators 426. Each metamorphic indicator 424 is associated with a different corresponding feature game enhancement. The method 3600 then proceeds to block 3612.

At block 3612, the method 3600 includes providing, using the one or more processors 412, the feature game with one or more feature game enhancements associated with one or more corresponding metamorphic indicators 424 transitioned to the triggered state in previous game play. Non-limiting examples of the feature game enhancements may include the first feature game enhancement (e.g., the predetermined credit value), the second feature game enhancement (e.g., the multiplier), and/or the third feature game enhancement (e.g., the summing feature), as previously discussed above. The method 3600 then returns to block 3602.

At block 3614, the method 3600 includes generating, using the one or more processors 412, a base game outcome. The one or more GUIs 402 for the base game may present five columns of symbol windows 416 (i.e., one column for each reel as described above), and each symbol window 416 may, for example, serve as a placeholder in which a symbol 418 is displayed at the conclusion of a play of the base game. The symbols 418 may be selected from a plurality of different symbols 418 available for selection and display in the symbol windows 416. The processor 412 may cause, in the base game outcome, the bonus metamorphic trigger symbol 408 or one or more regular metamorphic trigger symbols 420 displayed by the one or more GUIs 402 to be displayed. The method 3600 then proceeds to block 3616.

At block 3616, the method 3600 includes determining, using the one or more processors 412, whether the bonus symbol window 406 is showing the jackpot trigger symbol 404. If the one or more processors 412 determines that the bonus symbol window 406 is showing the jackpot trigger symbol 404, then the method proceeds to block 3618. If the one or more processors 412 determines that the bonus symbol window 406 is not showing the jackpot trigger symbol 404, then the method proceeds to block 3620.

At block 3618, the method 3600 includes providing, using the one or more processors 412, the jackpot chance game. Similar to block 3608, for each instance of the jackpot chance game, the one or more GUIs 402 are caused to sequentially present one or more jackpot values. Each presented jackpot value in the instance of the jackpot chance game is larger than any jackpot value previously presented in the instance of the jackpot chance game. The jackpot value presented at the conclusion of the instance of the jackpot chance game is caused to be added to the credit meter 446 displayed by the one or more GUIs 402. The method 3600 then proceeds to block 3624.

At block 3620, the method 3600 includes determining, using the one or more processors 412, whether the bonus symbol window 406 shows a bonus metamorphic trigger symbol 408 in the base game outcome. If the one or more processors 412 determines that the bonus symbol window 406 shows the bonus metamorphic trigger symbol 408, the method 3600 proceeds to block 3622. If the one or more processors 412 determines that the bonus symbol window 406 does not show the bonus metamorphic trigger symbol 408, the method 3600 proceeds to block 3624.

At block 3622, the method 3600 includes potentially updating, using the one or more processors 412, a graphical state of a bonus metamorphic indicator 422. The processor 412 may associate the bonus metamorphic indicator 422 with a corresponding ordered sequence of graphical states associated with the metamorphic indicator 424 (e.g., a piggy bank) receiving an item, flow, or transmission from the metamorphic trigger symbol (e.g., a coin or flow of particles from a colored coin). The bonus metamorphic indicator 422 may increase in magnitude (e.g., size, brightness, animation speed, etc., such as a piggy bank growing larger until it explodes, the piggy bank emitting light with incrementally larger luminosity, a medallion emitting light with incrementally larger luminosity until a fiery ring surrounds the medallion, etc.). The method 3600 then proceeds to block 3624.

At block 3624, the method 3600 includes determining, using the one or more processors 412 during the base game, whether the symbol windows 416 show one or more regular metamorphic trigger symbols 420. If the one or more processors 412 determines that the symbol windows 416 show one or more regular metamorphic trigger symbols 420, the method 3600 proceeds to block 3626. If the one or more processors 412 determines that the symbol windows 416 do not show one or more regular metamorphic trigger symbols 420, the method 3600 proceeds to block 3628.

At block 3626, the method 3600 includes potentially updating, using the one or more processors 412, a graphical state of the one or more regular metamorphic indicators 426. If the processor 412 makes the determination to update the graphical state of one or more of the regular metamorphic indicators 426, the processor updates such graphical state in a manner similar to that of block 3620 for the bonus metamorphic indicator 422. The method 3600 then proceeds to block 3628.

At block 3628, the method 3600 includes making, using the one or more processors 412, a random determination whether the feature game should be provided. If the one or more processors 412 randomly determines that the feature game should be provided, the method 3600 proceeds to block 3630. If the one or more processors 412 do not randomly determine that the feature game should be provided, the method 3600 returns to block 3602.

At block 3630, the method 3600 includes randomly causing, using the one or more processors 412, one or more metamorphic indicators 424 to trigger based on the metamorphic trigger symbols being shown in the base game outcome. The method 3600 then proceeds to block 3612.

It will be understood that the various GUIs and game mechanics discussed herein may be implemented entirely locally, e.g., by a processor or processors of a single device, such as a smartphone, or may be provided using processors located in different devices or systems. Information regarding the selection of symbols, awards associated with special symbols, etc., may be transmitted, e.g., via a network connection (wired, wireless, or a mixture of both) to another device, e.g., a smartphone, the processor or processors of which may then implement the GUI and/or feature game mechanic using the information regarding the symbols, awards, etc. Such information may be generated and/or sent in response to receipt of a request from such another device, e.g., a request from a smartphone for the server to provide such information. Such distributed-computing implementations of the GUI provisioning techniques discussed herein is to be understood to also be within the scope of this disclosure.

It will be appreciated that in such distributed computing arrangements, the computer-executable instructions for implementing the GUI may be distributed between different memory devices located in different devices, e.g., the computer-executable instructions for selecting symbols stored on one or more memory devices of a server, while the computer-executable instructions for presenting the GUI may be stored on one or more memory devices of a client gaming device, e.g., a smartphone.

In recognition of the possibility of such distributed processing arrangements, the term "collectively," as used herein with reference to memory devices and/or processors or various other items, should be understood to indicate that the referenced collection of items has the characteristics or provides the functionalities that are associated with that collection. For example, if a server and a client device collectively store instructions for causing A, B, and C to occur, this encompasses at least the following scenarios:

a) The server stores instructions for causing A, B, and C to occur, but the client device stores no instructions that cause A, B, and C to occur.
b) The client device stores instructions for causing A, B, and C to occur, but the server stores no instructions that cause A, B, and C to occur.
c) The server stores instructions for causing a proper subset of A, B, and C to occur, e.g., A and B but not C, and the client device stores instructions that cause a different proper subset of A, B, and C to occur, e.g., C but not A and B, where instructions for causing each of A, B, and C to occur are respectively stored on either or both the client device and the server.
d) The server stores instructions for causing a subset of A, B, and C to occur, e.g., A and B but not C, and the client device stores instructions that cause a different subset of A, B, and C to occur, e.g., B and C but not A, where instructions for causing each of A, B, and C to occur are respectively stored on either or both the client device and the server.
e) The server stores instructions for causing A and a portion of B to occur, and the client device stores instructions that cause C and the remaining portion of B to occur.

In all of the above scenarios, between the server and the client device, there are, collectively, instructions that are stored for causing A, B, and C to occur, i.e., such instructions are stored on one or both devices and it will be recognized that using the term "collectively," e.g., the server and the client device, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to, perform one or more actions, e.g., actions A, B, and C. As with the previous example, various permutations fall within the scope of such "collective" language:

a) The first set of one or more processors may be caused to perform each of A, B, and C, and the second set of one or more processors may not perform any of A, B, or C.
b) The second set of one or more processors may be caused to perform each of A, B, and C, and the first set of one or more processors may not perform any of A, B, or C.
c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.
d) The first set of one or more processors may be caused to perform A and a portion of B, and the second set of one or more processors may be caused to perform C and the remainder of B.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

one or more displays configured to present one or more graphical user interfaces (GUIs);

one or more processors; and one or more memory devices, the one or more memory devices storing computer-executable instructions which, when executed by the one or more processors, cause the one or more processors to:

receive an input indicating a request to play a feature game and a chance to play a jackpot chance game, cause, responsive to receipt of the input, the one or more GUIs to present an instant feature animation that concludes with an instant feature indicator being displayed in either a jackpot chance state or a feature game state, cause, based on the instant feature animation concluding with the instant feature indicator in the jackpot chance state, an instance of the jackpot chance game, wherein, for each instance of the jackpot chance game, the one or more GUIs are caused to sequentially present one or more jackpot values, each presented jackpot value in the instance of the jackpot chance game is larger than any jackpot value previously presented in the instance of the jackpot chance game, and the jackpot value presented at the conclusion of the instance of the jackpot chance game is caused to be added to a credit meter displayed by the one or more GUIs, cause, also responsive to receipt of the input, one or more of a plurality of metamorphic indicators displayed by the one or more GUIs to be displayed in a triggered state, wherein the plurality of metamorphic indicators includes a bonus metamorphic indicator and a plurality of regular metamorphic indicators, wherein each metamorphic indicator is associated with a different corresponding feature game enhancement, and cause, in association with causing the one or more metamorphic indicators to be displayed in the triggered state, a first instance of the feature game to be presented by the one or more GUIs, wherein the first instance of the feature game includes the corresponding feature game enhancement for each regular metamorphic indicator that was caused to be displayed in the triggered state in association with presentation of the first instance of the feature game.

2. The system of claim 1, wherein the one or more memory devices store additional computer-executable instructions which, when executed by the one or more processors, cause the one or more processors to cause, in association with causing the bonus metamorphic indicator to be displayed in the triggered state, a second instance of the feature game to be presented by the one or more GUIs, wherein the second instance of the feature game includes the corresponding feature game enhancement for each regular metamorphic indicator that was caused to be displayed in the triggered state in association with presentation of the first instance of the feature game.

3. The system of claim 2, wherein the one or more memory devices store additional computer-executable instructions which, when executed by the one or more processors, cause the one or more processors to cause the one or more GUIs to simultaneously present the first instance of the feature game and the second instance of the feature game.

4. The system of claim 2, wherein the one or more memory devices store additional computer-executable instructions which, when executed by the one or more processors, cause the one or more processors to cause the one or more GUIs to serially present the first instance of the feature game and the second instance of the feature game.

5. The system of claim 1, wherein the one or more memory devices store additional computer-executable instructions which, when executed by the one or more processors, cause the one or more processors to cause the bonus metamorphic indicator, when displayed in the triggered state, to be displayed in the triggered state in tandem with one or more of the regular metamorphic indicators being displayed in the triggered state.

6. The system of claim 1, wherein the one or more memory devices store additional computer-executable instructions which, when executed by the one or more processors, cause the one or more processors to associate each metamorphic indicator with a corresponding ordered sequence of graphical states.

7. The system of claim 1, wherein the one or more memory devices store additional computer-executable instructions which, when executed by the one or more processors, cause the one or more processors to:

cause the one or more GUIs to present, during a base game, a plurality of symbol windows, the plurality of symbol windows including a bonus symbol window, cause, responsive to each play of the base game, a corresponding symbol to be selected and displayed in each symbol window, cause, responsive to the symbol that is selected and displayed in the bonus symbol window being a bonus metamorphic trigger symbol, a random determination to be made as to whether to initiate the first instance of the feature game including at least one feature game enhancement associated with the regular metamorphic indicators, and cause, responsive to the symbol that is selected and displayed in the bonus symbol window being a jackpot trigger symbol, the instance of the jackpot chance game.

8. One or more non-transitory computer-readable media storing computer-executable instructions which, when executed by one or more processors, cause the one or more processors to:

receive an input indicating a request to play a feature game and a chance to play a jackpot chance game, cause, responsive to receipt of the input, the one or more GUIs to present an instant feature animation that concludes with an instant feature indicator being displayed in either a jackpot chance state or a feature game state, initiate, based on the instant feature animation concluding with the instant feature indicator in the jackpot chance state, an instance of a jackpot chance game, wherein, for each instance of the jackpot chance game, the one or more GUIs are caused to sequentially present one or more jackpot values, each presented jackpot value in the instance of the jackpot chance game is larger than any jackpot value previously presented in the instance of the jackpot chance game, and the jackpot value presented at the conclusion of the instance of the jackpot chance game is caused to be added to a credit meter displayed by the one or more GUIs, cause one or more of a plurality of metamorphic indicators displayed by the one or more GUIs to be displayed in a triggered state, wherein the plurality of metamorphic indicators includes a bonus metamorphic indicator and a plurality of regular metamorphic indicators, each metamorphic indicator is associated with a different corresponding feature game enhancement, and cause, in association with causing the one or more metamorphic indicators to be displayed in the triggered state, a first instance of the feature game to be presented by the one or more GUIs, wherein the first instance of the feature game includes the corresponding feature game enhancement for each regular metamorphic indicator that was caused to be displayed in the triggered state in association with presentation of the first instance of the feature game.

9. The one or more non-transitory computer-readable media of claim 8, wherein the one or more computer-readable media store additional computer-executable instructions which, when executed by one or more processors, cause the one or more processors to:

cause, in association with causing the bonus metamorphic indicator to be displayed in the triggered state, a second instance of the feature game to be presented by the one or more GUIs, wherein the second instance of the feature game includes the corresponding feature game enhancement for each regular metamorphic indicator that was caused to be displayed in the triggered state in association with presentation of the first instance of the feature game.

10. The one or more non-transitory computer-readable media of claim 9, wherein the one or more computer-readable media store additional computer-executable instructions which, when executed by one or more processors, cause the one or more processors to:

cause the one or more GUIs to simultaneously present the first instance of the feature game and the second instance of the feature game.

11. The one or more non-transitory computer-readable media of claim 9, wherein the one or more computer-readable media store additional computer-executable instructions which, when executed by one or more processors, cause the one or more processors to:

cause the one or more GUIs to serially present the first instance of the feature game and the second instance of the feature game.

12. The one or more non-transitory computer-readable media of claim 8 wherein the one or more computer-readable media store additional computer-executable instructions which, when executed by one or more processors, cause the one or more processors to:

cause the bonus metamorphic indicator, when displayed in the triggered state, to be displayed in the triggered state in tandem with one or more of the regular metamorphic indicators being displayed in the triggered state.

13. The one or more non-transitory computer-readable media of claim 8 wherein the one or more computer-readable media store additional computer-executable instructions which, when executed by one or more processors, cause the one or more processors to:

associate each metamorphic indicator with a corresponding ordered sequence of graphical states.

14. The one or more non-transitory computer-readable media of claim 8 wherein the one or more computer-readable media store additional computer-executable instructions which, when executed by one or more processors, cause the one or more processors to:

cause the one or more GUIs to present, during a base game, a plurality of symbol windows, the plurality of symbol windows including a bonus symbol window;

cause, responsive to each play of the base game, a corresponding symbol to be selected and displayed in each symbol window;

cause, responsive to the symbol that is selected and displayed in the bonus symbol window being a bonus metamorphic trigger symbol, a random determination to be made as to whether to initiate the first instance of the feature game including at least one of the feature game enhancements associated with the regular metamorphic indicators; and cause, responsive to the symbol that is selected and displayed in the bonus symbol window being a jackpot trigger symbol, the instance of the jackpot chance game.

15. A method for operating a system having one or more displays and one or more non-transitory computer readable storage media, with the non-transitory computer readable storage medium having one or more processors and one or more memory devices, the one or more memory devices storing computer-executable instructions, the method comprising:

receiving an input indicating a request to play a feature game and a chance to play a jackpot chance game;

causing, responsive to receipt of the input, one or more graphical user interfaces (GUIs) to present an instant feature animation that concludes with an instant feature indicator being displayed in either a jackpot chance state or a feature game state;

causing, based on the instant feature animation concluding with the instant feature indicator in the jackpot chance state, an instance of a jackpot chance game, wherein, for each instance of the jackpot chance game, the one or more GUIs are caused to sequentially present one or more jackpot values, each presented jackpot value in the instance of the jackpot chance game is larger than any jackpot value previously presented in the instance of the jackpot chance game, and the jackpot value presented at the conclusion of the instance of the jackpot chance game is caused to be added to a credit meter displayed by the one or more GUIs;

causing one or more of a plurality of metamorphic indicators displayed by the one or more GUIs to be displayed in a triggered state, wherein the plurality of metamorphic indicators includes a bonus metamorphic indicator and a plurality of regular metamorphic indicators, each metamorphic indicator is associated with a different corresponding feature game enhancement; and causing, in association with causing the one or more metamorphic indicators to be displayed in the triggered state, a first instance of the feature game to be presented by the one or more GUIs, wherein the first instance of the feature game includes the corresponding feature game enhancement for each regular metamorphic indicator that was caused to be displayed in the triggered state in association with presentation of the first instance of the feature game.

16. The method of claim 15, further comprising:

causing, in association with causing the bonus metamorphic indicator to be displayed in the triggered state, a second instance of the feature game to be presented by the one or more GUIs, wherein the second instance of the feature game includes the corresponding feature game enhancement for each regular metamorphic indicator that was caused to be displayed in the triggered state in association with presentation of the first instance of the feature game.

17. The method of claim 16, further comprising:

causing the one or more GUIs to simultaneously present the first instance of the feature game and the second instance of the feature game.

18. The method of claim 15, further comprising:

causing the bonus metamorphic indicator, when displayed in the triggered state, to be displayed in the triggered state in tandem with one or more of the regular metamorphic indicators being displayed in the triggered state.

19. The method of claim 18, further comprising:

associating each of the metamorphic indicators with a corresponding ordered sequence of graphical states.

20. The method of claim 18, further comprising:

causing the one or more GUIs to present, during a base game, a plurality of symbol windows, the plurality of symbol windows including a bonus symbol window;

causing, responsive to each play of the base game, a corresponding symbol to be selected and displayed in each symbol window;

causing, responsive to the symbol that is selected and displayed in the bonus symbol window being a bonus metamorphic trigger symbol, a random determination to be made as to whether to initiate the first instance of the feature game including at least one of the feature game enhancements associated with the regular metamorphic indicators; and causing, responsive to the symbol that is selected and displayed in the bonus symbol window being a jackpot trigger symbol, the instance of the jackpot chance game.

* * * * *